United States Patent
Harashina et al.

(10) Patent No.: US 7,498,375 B2
(45) Date of Patent: Mar. 3, 2009

(54) FLAME-RETARDANT RESIN COMPOSITION

(75) Inventors: Hatsuhiko Harashina, Fuji (JP); Shinya Yamada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 188 days.

(21) Appl. No.: 10/496,183

(22) PCT Filed: Nov. 28, 2002

(86) PCT No.: PCT/JP02/12406

§ 371 (c)(1),
(2), (4) Date: May 20, 2004

(87) PCT Pub. No.: WO03/046085

PCT Pub. Date: Jun. 5, 2003

(65) Prior Publication Data

US 2005/0004292 A1 Jan. 6, 2005

(30) Foreign Application Priority Data

Nov. 30, 2001 (JP) .............................. 2001-368004

(51) Int. Cl.
*C08L 1/00* (2006.01)
(52) U.S. Cl. .................. 524/430; 524/495; 524/504
(58) Field of Classification Search ............. 524/430, 524/495, 504
See application file for complete search history.

(56) References Cited

U.S. PATENT DOCUMENTS 4,731,401 A 3/1988 Moteki et al.

FOREIGN PATENT DOCUMENTS

| EP | 0 791 634 A | | 8/1997 |
|---|---|---|---|
| EP | 0 791632 A2 | * | 8/1997 |
| JP | 60-47056 | | 3/1985 |
| JP | 61-287960 | | 12/1986 |
| JP | 62-201963 | | 9/1987 |
| JP | 63-92667 | | 4/1988 |
| JP | 63-150349 | | 6/1988 |
| JP | 6-25506 | | 2/1994 |
| JP | 9-111059 | | 4/1997 |
| JP | 10-77396 | | 3/1998 |
| JP | 10-195283 | | 7/1998 |
| JP | 11-152402 | | 6/1999 |
| JP | 2000-212411 | * | 8/2000 |
| WO | WO 92/11314 | | 7/1992 |

* cited by examiner

*Primary Examiner*—Robert D. Harlan
(74) *Attorney, Agent, or Firm*—Nixon & Vanderhye, PC

(57) ABSTRACT

A flame-retardant resin composition comprises (A) abase resin; (B) a flame retardant comprising (B1) at least one aromatic resin selected from a polyphenylene oxide-series resin and a polyphenylene sulfide-series resin, (B2) a phosphoric ester, and (B3) a nitrogen-containing cyclic compound; and (C) a styrenic resin having a melt flow rate of not more than 8 g/10 minutes. The base resin may be a polyester-series resin. The styrenic resin (C) may be a styrenic resin having a melt flow rate of 0.1 g/10 minutes to not more than 5 g/10 minutes. The phosphoric ester (B2) may be a condensed phosphoric ester, and the nitrogen-containing cyclic compound (B3) may be a polyphosphate of an amino group-containing triazine compound, a polyphosphoric acid amide, or others. The present invention provides a flame-retardant resin composition which has been flame-retarded without using a halogen-containing flame retardant.

16 Claims, No Drawings

FLAME-RETARDANT RESIN COMPOSITION

This application is the U.S. national phase of international application PCT/JP02/12406 filed 28 Nov. 2002 which designated the U.S. and claims benefit of JP 368004/2001, dated 30 Nov. 2001, the entire content of which is hereby incorporated by reference.

TECHNICAL FIELD

The present invention relates to a flame-retardant resin composition comprising a base resin, a flame retardant (e.g., a polyphenylene oxide-series resin and/or a polyphenylene sulfide-series resin, a phosphoric ester, and a nitrogen-containing cyclic compound) and a styrenic resin having a melt flow rate of not more than 8 g/10 minutes (in accordance with Japanese Industrial Standards (JIS) K7210), and a process for producing the composition, as well as a shaped article formed with the flame-retardant resin composition.

BACKGROUND ART

Among thermoplastic resins, a polyester-series resin (such as a polybutylene terephthalate), a styrenic resin, or the like has excellent mechanical and electrical properties, weather resistance, water resistance, and resistance to chemicals and solvents. Therefore, the resin has been utilized for various purposes such as electric or electronic device parts, and automotive parts. While, these resins are required to have improved flame retardancy as the field of their uses expands.

Japanese Patent Application Laid-Open No. 287960/1986 (JP-61-287960A) discloses a process for injection molding a polyamide resin with improving moldability of the resin, which comprises adding a polyester resin having a butylene naphthalate unit to a polyamide resin having a xylylene adipamide unit. Japanese Patent Application Laid-Open No. 201963/1987 (JP-62-201963A) discloses a polyester resin composition of which gas barrier property and transparency are improved by adding a metaxylylene group-containing polyamide resin and a compatibilizing agent to a thermoplastic polyester resin. Further, Japanese Patent Application Laid-Open No. 92667/1988 (JP-63-92667A) discloses a resin composition for stretch-blow molding which comprises a polyester resin having an ethylene terephthalate unit, a metaxylylene group-containing polyamide resin, a specific thermoplastic resin, and additionally a mica powder. In these literatures, moldability, gas barrier property or transparency of resins is improved, however, flame retardant thereof is insufficient.

Therefore, there has been proposed a method for imparting flame retardancy to a thermoplastic resin by adding a flame retardant comprising a halogen-containing compound or an antimony-containing compound to the resin. For example, Japanese Patent Application Laid-Open No. 150349/1988 (JP-63-150349A) discloses a resin composition to which flame retardancy is imparted by blending a glass fiber, an organic halogen-containing flame retardant, antimony trioxide, and a hydroxide of an alkali metal or of alkaline earth metal to a mixed resin comprising a polyamide resin and a nylon 66. However, the halogen-containing flame retardant is not preferable for environmental reasons because the flame retardant sometimes generates a dioxin-series compound on resolution caused by combustion. Therefore, there is proposed a method for rendering a resin flame-retardant by using a phosphorus-containing or nitrogen-containing compound as a halogen-free flame retardant.

Japanese Patent Application Laid-Open No. 25506/1994 (JP-6-25506A) discloses a flame-retardant resin composition in which a phosphorus-containing compound is added to a thermoplastic resin composition containing a copolymer of an aromatic vinyl compound and a vinyl monomer, a graft copolymer with or using a rubber-like polymer, and a novolak resin. Japanese Patent Application Laid-Open No. 111059/1997 (JP-9-111059A) discloses a flame-retardant resin composition in which to a polyolefinic resin is blended a certain amount of a phenolic resin, a phosphorus-containing compound (red phosphorus) and an expansive graphite. Moreover, Japanese Patent Application Laid-Open No. 195283/1998 (JP-10-195283A) discloses a polyester resin composition to which flame retardancy is imparted with the combination use of a phosphoric ester having a specific structure and a suitable amount of specific compound(s) (a novolak phenol resin, and an oxide of iron, cobalt, nickel or copper). Japanese Patent Application Laid-Open No. 152402/1999 (JP-11-152402A) discloses a flame-retardant polyester resin composition which comprises a polybutylene terephthalate, a reinforcing component, and a flame retardant composed of an aromatic phosphate oligomer and a melamine pyrophosphate, and in which the proportion of the flame retardant is about 35 to 55% by weight relative to the polymer component.

The halogen-free flame retardant does not comprise harmful halogens, however, it is inferior to a halogen-containing flame retardant in flame retardancy, so that it is necessary to add a large amount of the flame retardant. The addition of a large amount of the flame retardant brings about bleeding out (or blooming), generation of mold deposit, and deterioration in mechanical properties of a resin. Therefore, it is impossible to improve mechanical properties along with flame retardancy. For example, in the case using an expansive graphite in combination with the flame retardant, the resin significantly deteriorates its external appearance on molding. In particular, use of a phosphoric ester as a phosphorus-containing compound brings about bleeding out, generation of mold deposit, or deterioration in thermal stability of the resin.

Thus, in conventional methods, it is difficult to render a resin high flame-retardant without deteriorating properties of the resin. Moreover, the above-mentioned flame retardant is capable of imparting flame-retardant to a specific resin, however, it is impossible to render a wide variety of thermoplastic resins flame-retardant.

It is therefore an object of the present invention to provide a halogen-free flame-retardant resin composition which has a shortened combustion time or growing time and inhibited dripping properties, and is rendered flame-retardant a high level with the use of a small amount of a flame retardant, and a process for producing the same.

It is another object of the present invention to provide a flame-retardant resin composition in which mold deposit and bleeding out (or blooming) of a flame retardant is effectively inhibited and to which high flame retardancy is imparted without deteriorating properties of the resin, and a process for producing the same.

It is still another object of the present invention to provide a flame-retardant resin composition which is excellent in hydrolysis resistance even in the case using a phosphoric ester, and a process for producing the same.

It is a further object of the present invention to provide a shaped article having improved flame retardancy.

DISCLOSURE OF THE INVENTION

The inventors of the present invention made intensive studies to achieve the above objects and finally found that addition of a specific halogen-free flame retardant to a base resin ensures inhibition of dripping and imparts high flame-retardant to the resin. The present invention was accomplished based on the above finding.

That is, the flame-retardant resin composition of the present invention comprises (A) a base resin, (B) a flame retardant, and (C) a styrenic resin, in which the flame retardant comprises (B1) at least one aromatic resin selected from the group consisting of a polyphenylene oxide-series resin and a polyphenylene sulfide-series resin, (B2) a phosphoric ester, and (B3) a nitrogen-containing cyclic compound; and the styrenic resin (C) has a melt flow rate of not more than 8 g/10 minutes (at a test temperature of 200° C. and a test load of 49N in accordance with Japanese Industrial Standards (JIS) K7210). The styrenic resin (C) may comprise at least one member selected from the group consisting of (1) a homo- or copolymer of an aromatic vinyl monomer, (2) a copolymer of an aromatic vinyl monomer and a vinyl cyanide monomer, and (3) a graft copolymer in which an aromatic vinyl monomer and a vinyl cyanide monomer are grafted to a rubber component. The styrenic resin (C) may comprise a styrenic resin (in particular a polystyrene having a melt flow rate of 0.1 g/10 minutes to not more than 5 g/10 minutes). The base resin comprises a polyester-series resin, a polyamide-series resin, a polycarbonate-series resin, a vinyl-series resin, an olefinic resin, an acrylic resin, and others. In the resin composition, the phosphoric ester (B2) may comprise a condensed phosphoric ester, and the nitrogen-containing cyclic compound (B3) may comprise a polyphosphate of an amino group-containing triazine compound (e.g., a salt of a polyphosphoric acid having a condensation degree of 3 to 200 with at least one member selected from the group consisting of melamine and a melamine condensate) and a polyphosphoric acid amide.

Further, the flame-retardant resin composition of the present invention may comprise (D) an inorganic filler, (E) a flame-retardant auxiliary (or flame-retardant synergist) such as (E1) a resinous flame-retardant auxiliary (an aromatic resin such as a polycarbonate-series resin, an aromatic nylon, a polyarylate-series resin, an aromatic epoxy resin, and a resin of which the main chain or side chain contains an aromatic ring having at least one group selected from a hydroxyl group and an amino group), and (E2) an inorganic flame-retardant auxiliary (e.g., a metal borate, a metal hydrogenphosphate, a red phosphorus, a metal oxide, a metal hydroxide, a metal sulfide, and an expansive graphite), a hindered phenol-series antioxidant, a phosphorus-containing stabilizer, an inorganic stabilizer, a compound having a functional group reactive to an active hydrogen atom (reactive stabilizer), a fluorine-contained resin, and others.

Moreover, the present invention also includes a process for producing a flame-retardant resin composition, which comprises mixing the base resin (A), the flame retardant (B), and the styrenic resin (C), as well as a shaped article formed with the flame-retardant resin composition (e.g., an electric or electronic device part, an office automation (OA) device part, a household electrical appliance part, an automotive part, or a mechanical part or machine element).

BEST MODE FOR CARRYING OUT THE INVENTION

[Base Resin (A)]

The base resin (A) includes various resins utilizable for molding process, and for example, a polyester-series resin, a polyamide-series resin, a polycarbonate-series resin, a vinyl-series resin, an olefinic resin, an acrylic resin, and others.

(1) Polyester-series Resin

The polyester-series resin is a homopolyester or copolyester obtained by, for example, a polycondensation of a dicarboxylic acid component and a diol component, a polycondensation of a hydroxycarboxylic acid or a lactone, or a polycondensation of these components. The preferred polyester-series resin usually includes a saturated polyester-series resin, in particular an aromatic saturated polyester-series resin.

The dicarboxylic acid component includes, for example, an aliphatic dicarboxylic acid (e.g., a dicarboxylic acid having about 4 to 40 carbon atoms such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid, preferably a dicarboxylic acid having about 4 to 14 carbon atoms), an alicyclic dicarboxylic acid (e.g., a dicarboxylic acid having about 8 to 12 carbon atoms such as hexahydrophthalic acid, hexahydroisophthalic acid, hexahydroterephthalic acid, and himic acid), an aromatic dicarboxylic acid [e.g., a dicarboxylic acid having about 8 to 16 carbon atoms such as phthalic acid, isophthalic acid, terephthalic acid, a naphthalenedicarboxylic acid (such as 2,6-naphthalenedicarboxylic acid), 4,4'-diphenyldicarboxylic acid, 4,4'-diphenoxyetherdicarboxylic acid, bis(4-carboxyphenyl)ether, 4,4'-diphenylmethanedicarboxylic acid, and 4,4°-diphenylketonedicarboxylic acid], or a derivative thereof (e.g., a derivative, capable of producing an ester, such as a lower alkyl ester, an aryl ester, and an acid anhydride). These dicarboxylic acid components may be used singly or in combination. Further, if necessary, the dicarboxylic acid component may be used in combination with a polyfunctional carboxylic acid such as trimellitic acid and pyromellitic acid.

The preferred dicarboxylic acid component includes an aromatic dicarboxylic acid such as terephthalic acid, isophthalic acid, and naphthalenedicarboxylic acid.

As the diol component, for example, there are mentioned an aliphatic alkylene glycol (e.g., an aliphatic glycol having about 2 to 12 carbon atoms such as ethylene glycol, trimethylene glycol, propylene glycol, 1,4-butanediol, 1,3-butanediol, neopentyl glycol, hexanediol, octanediol and decanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropylene glycol, a polytetramethylene glycol], an alicyclic diol (e.g., 1,4-cyclohexanediol, 1,4-cyclohexanedimethanol, hydrogenated bisphenol A), and others. Moreover, the diol component may be used in combination with an aromatic diol such as hydroquinone, resorcinol, biphenol, 2,2-bis(4-hydroxyphenyl)propane, 2,2-bis-(4-(2-hydroxyethoxy)phenyl)propane, and xylylene glycol. These diol components may be used singly or in combination. Further, if necessary, the diol component may be used in combination with a polyol such as glycerin, trimethylolpropane, trimethylolethane and pentaerythritol.

The preferred diol component includes a $C_{2-6}$ alkylene glycol (e.g., a linear alkylene glycol such as ethylene glycol, trimethylene glycol, propylene glycol and 1,4-butanediol), a polyoxyalkylene glycol having a repeating oxyalkylene unit of about 2 to 4 [a glycol containing a poly(oxy-$C_{2-4}$alkylene) unit, such as diethylene glycol and a polytetramethylene glycol], and 1,4-cyclohexanedimethanol.

The hydroxycarboxylic acid includes, for example, a hydroxycarboxylic acid such as hydroxybenzoic acid, hydroxynaphthoic acid, hydroxyphenylacetic acid, glycolic acid and hydroxycaproic acid, or a derivative thereof.

Exemplified as the lactone is a $C_{3-12}$lactone such as propiolactone, butyrolactone, valerolactone, and caprolactone (e.g., ε-caprolactone), and others.

The preferred polyester-series resin includes a homopolyester or copolyester containing an alkylene arylate unit (such as an alkylene terephthalate and an alkylene naphthalate) as a main unit (e.g., about 50 to 100% by weight, preferably about 75 to 100% by weight) [for example, a homopolyester such as a polyalkylene terephthalate (e.g., a poly$C_{2-4}$alkylene terephthalate such as a poly(1,4-cyclohexanedimethylene terephthalate) (PCT), a polyethylene terephthalate (PET), a polypropylene terephthalate (PPT) and a polybutylene terephthalate (PBT)), and a polyalkylene naphthalate (e.g., a poly$C_{2-4}$alkylene naphthalate such as a polyethylene naphthalate and a polybutylene naphthalate); and a copolyester containing alkylene terephthalate and/or alkylene naphthalate unit(s) as a main unit (e.g., not less than 50% by weight)]. The particularly preferred polyester-series resin includes a polybutylene terephthalate-series resin containing a butylene terephthalate unit as a main unit (e.g., a polybutylene terephthalate, and a polybutylene terephthalate copolyester), a polyethylene terephthalate-series resin containing an ethylene terephthalate unit as a main unit (e.g., a polyethylene terephthalate, and a polyethylene terephthalate copolyester). Incidentally, these polyester-series resins may be used singly or in combination.

Moreover, in the copolyester, a copolymerizable monomer includes a $C_{2-6}$alkylene glycol (e.g., a linear alkylene glycol such as ethylene glycol, propylene glycol and 1,4-butanediol), a polyoxyalkylene glycol which has a repeating oxyalkylene unit of about 2 to 4 (e.g., a glycol comprising a poly(oxy-$C_{2-4}$alkylene) unit, such as diethylene glycol and a polytetramethylene glycol), a $C_{6-12}$aliphatic dicarboxylic acid (e.g., adipic acid, pimelic acid, suberic acid, azelaic acid, sebacic acid), an aromatic dicarboxylic acid (e.g., phthalic acid, isophthalic acid), an aromatic hydroxycarboxylic acid (e.g., hydroxybenzoic acid, hydroxynaphthoic acid), and others. Incidentally, the polyester-series resin may have not only a linear chain structure but also a branched chain structure, or crosslinked structure as far as melt-moldability thereof is not deteriorated. Moreover, the polyester-series resin may be a liquid crystalline polyester.

The polyester-series resin may be produced by a conventional manner, for example, transesterification, direct esterification.

(2) Polyamide-series Resin

The polyamide includes a polyamide derived from a diamine and a dicarboxylic acid; a polyamide obtained from an aminocarboxylic acid, and if necessary in combination with a diamine and/or a dicarboxylic acid; a polyamide derived from a lactam, and if necessary in combination with a diamine and/or a dicarboxylic acid. The polyamide also includes a copolyamide derived from at least two different kinds of polyamide constituent components.

As the diamine, there may be mentioned, for example, an aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis (4-aminocyclohexyl)methane and bis(4-amino-3-methylcyclohexyl)methane. Moreover, the diamine may be used in combination with an aromatic diamine such as phenylenediamine and metaxylylenediamine. These diamines may be used singly or in combination.

Examples of the dicarboxylic acid are a $C_{4-20}$ aliphatic dicarboxylic acid such as glutaric acid, adipic acid, pimelic acid, suberic acid, azelaic acid, sebacic acid and octadecanoic diacid; a dimerized fatty acid (dimeric acid); an alicyclic dicarboxylic acid such as cyclohexane-1,4-dicarboxylic acid and cyclohexane-1,3-dicarboxylic acid; an aromatic dicarboxylic acid such as phthalic acid, phthalic anhydride, isophthalic acid, terephthalic acid and naphthalenedicarboxylic acid; and others.

As the aminocarboxylic acid, there may be mentioned, for example, a $C_{4-20}$aminocarboxylic acid such as aminoheptanoic acid, aminononanoic acid and aminoundecanoic acid. These aminocarboxylic acids may be also used singly or in combination.

As the lactam, for example, there may be mentioned a $C_{4-20}$lactam such as butyrolactam, pivalolactam, caprolactam, caprilactam, enantholactam, undecanolactam and dodecalactam. These lactams may be also used singly or in combination.

The polyamide-series resin includes an aliphatic polyamide (such as a nylon 46, a nylon 6, a nylon 66, a nylon 610, a nylon 612, a nylon 11 and a nylon 12), a polyamide obtainable from an aromatic dicarboxylic acid (e.g., terephthalic acid and/or isophthalic acid) and an aliphatic diamine (e.g., hexamethylenediamine, nonamethylenediamine), a polyamide obtainable from both aromatic and aliphatic dicarboxylic acids (e.g., both terephthalic acid and adipic acid), and an aliphatic diamine (e.g., hexamethylenediamine), and others. These polyamides may be used singly or in combination. The preferred polyamide includes a non-aromatic and aliphatic polyamide (e.g., a nylon 6, a nylon 66, a nylon 610, a nylon 612, a nylon 11, a nylon 12), a semiaromatic polyamide (e.g., a nylon MXD6, a nylon 9T), a copolymerized semiaromatic polyamide (e.g., a nylon 6T/6, a nylon 6T/66, a nylon 6T/12, a nylon 6I/6, a nylon 6I/66, a nylon 6T/6I, a nylon 6T/6I/6, a nylon 6T/6I/66, a nylon 6T/M5T), and others. These polyamide-series resins may be used singly or in combination.

(3) Polycarbonate-series Resin

The polycarbonate-series resin includes a polymer obtainable through the reaction of a dihydroxy compound with phosgene or a carbonic ester such as diphenyl carbonate. The dihydroxy compound may be an alicyclic compound, and is preferably a bisphenol compound.

The bisphenol compound includes a bis(hydroxyaryl)$C_{1-6}$alkane such as bis(4-hydroxyphenyl)methane, 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; a bis(hydroxyaryl) $C_{4-10}$cycloalkane such as 1,1-bis(4-hydroxyphenyl) cyclopentane and 1,1-bis(4-hydroxyphenyl)cyclohexane;

4,4'-dihydroxydiphenyl ether; 4,4'-dihydroxydiphenyl sulfone; 4,4'-dihydroxydiphenyl sulfide; 4,4'-dihydroxydiphenyl ketone; and others.

The preferred polycarbonate-series resin includes a bisphenol A-based polycarbonate. These polycarbonate-series resins may be used singly or in combination.

(4) Vinyl-series Resin

The vinyl-series resin includes a homo- or copolymer of a vinyl-series monomer [e.g., a vinyl ester such as vinyl acetate, vinyl propionate, vinyl crotonate and vinyl benzoate; a chlorine-containing vinyl monomer (e.g., vinyl chloride, chloroprene); a fluorine-containing vinyl monomer (e.g., fluoroethylene); a vinyl ketone such as methyl vinyl ketone and methyl isopropenyl ketone; a vinyl ether such as vinyl methyl ether and vinyl isobutyl ether; and a vinyl amine such as N-vinylcarbazole and N-vinylpyrrolidone], or a copolymer of a vinyl-series monomer and other copolymerizable monomer.

A derivative of the above-mentioned vinyl-series resin (e.g., a polyvinyl alcohol, a polyvinyl acetal such as a polyvinyl formal and a polyvinyl butyral, an ethylene-vinyl acetate copolymer, an ethylene-vinyl alcohol copolymer) may be also used. These vinyl-series resins may be used singly or in combination.

(5) Olefinic Resin

The olefinic resin includes, for example, a homo- or copolymer of an $\alpha$-$C_{2-10}$olefin such as ethylene and propylene, particularly a propylene-series resin (e.g., a propylene-ethylene copolymer, and a propylene-(meth)acrylic acid copolymer).

(6) Acrylic Resin

The acrylic resin includes, for example, a homo- or copolymer of a (meth)acrylic monomer (e.g., (meth)acrylic acid or an ester thereof), in addition a (meth)acrylic acid-styrene copolymer, a methyl(meth)acrylate-styrene copolymer, and others.

(7) Other Resins

As other resins, there may be exemplified a polyacetal resin, an aliphatic polyketone-series resin (ketone resin); a polysulfone [e.g., a thermoplastic polysulfone, a poly(ether sulfone), a poly(4,4'-bisphenol ether sulfone)]; a polyether ketone; a poly(ether ether ketone); a polyether imide; a thermoplastic polyurethane-series resin [e.g., a polymer obtainable from a reaction of a diisocyanate compound (such as tolylenediisocyanate) with the above-mentioned glycol and/or the above-mentioned diamine; and a polyurethane elastomer which may have a segment such as a polytetramethylene glycol]; a thermoplastic polyimide; a polyoxybenzylene; a thermoplastic elastomer; and the like.

These polymer compounds may be used singly or in combination.

The preferred thermoplastic resin includes a polyester-series resin which may be a liquid crystalline polyester, a polyamide-series resin, a polycarbonate-series resin, and a vinyl-series resin, and more preferably includes a polyester-series resin, and a polycarbonate-series resin. In particular, a polyester-series resin (such as PBT-series resin and PET-series resin) is preferred.

The number average molecular weight of the thermoplastic resin is not particularly limited to a specific one, and is suitably selected depending on a kind or application of resin. For example, the number average molecular weight may be selected within the range of about $5 \times 10^3$ to $200 \times 10^4$, preferably about $1 \times 10^4$ to $150 \times 10^4$, and more preferably about $1 \times 10^4$ to $100 \times 10^4$. Moreover, in the case where the thermoplastic resin is a polyester-series resin, the number average molecular weight may for example be about $5 \times 10^4$ to $100 \times 10^4$, preferably about $1 \times 10^4$ to $70 \times 10^4$, and more preferably about $1.2 \times 10^4$ to $30 \times 10^4$.

[Flame Retardant (B)]

The flame retardant (B) comprises (B1) at least one aromatic resin selected from the group consisting of a polyphenylene oxide-series resin and a polyphenylene sulfide-series resin, (B2) a phosphoric ester, and (B3) a nitrogen-containing cyclic compound.

(B1) Aromatic Resin

The aromatic resin (B1) comprises a polyphenylene oxide-series resin and/or a polyphenylene sulfide-series resin (at least one aromatic resin selected from the group consisting of a polyphenylene oxide-series resin and a polyphenylene sulfide-series resin).

(1) Polyphenylene Oxide-series Resin

The polyphenylene oxide-series resin (polyphenylene ether-series resin) includes a homopolymer and a copolymer. As the homopolymer, there may be mentioned a poly(mono-, di- or tri$C_{1-6}$alkyl-phenylene)oxide such as a poly(2,6-dimethyl-1,4-phenylene)oxide, a poly(2,5-dimethyl-1,4-phenylene)oxide, a poly(2,5-diethyl-1,4-phenylene)oxide, a poly(2-methyl-6-ethyl-1,4-phenylene)oxide, a poly(2,6-di-n-propyl-1,4-phenylene)oxide, a poly(2-ethyl-6-isopropyl-1,4-phenylene)oxide, a poly(2-methyl-6-methoxy-1,4-phenylene)oxide, a poly(2-methyl-6-hydroxyethyl-1,4-phenylene)oxide, a poly(2,3,6-trimethyl-1,4-phenylene)oxide, a poly(2,6-diphenyl-1,4-phenylene)oxide, and a poly(2-methyl-6-phenyl-1,4-phenylene)oxide; a poly(mono- or di$C_{6-20}$aryl-phenylene)oxide; and a poly(mono$C_{1-6}$alkyl-mono$C_{6-20}$aryl-phenylene)oxide.

As the copolymer of a polyphenylene oxide, there may be mentioned: a copolymer having not less than two monomer units constituting the above-mentioned homopolymers (e.g., a random copolymer having 2,6-dimethyl-1,4-phenylene oxide unit and 2,3,6-trimethyl-1,4-phenylene oxide unit); a modified polyphenylene oxide copolymer comprising an alkylphenol-modified benzene formaldehyde resin block which is obtainable by a reaction of an alkylphenol (such as cresol and p-tert-butylphenol) with a benzene formaldehyde resin (a condensation product of a benzene ring-containing compound and formaldehyde, such as a phenol resin) or alkylbenzene formaldehyde resin, and a polyphenylene oxide block as the main structure; a modified graft copolymer in which a styrenic polymer and/or an unsaturated carboxylic acid or an acid anhydride thereof (e.g., (meth)acrylic acid, maleic anhydride) is grafted to a polyphenylene oxide or a copolymer thereof; and others. These polyphenylene oxide-series resins may be used singly or in combination.

The number average molecular weight of the polyphenylene oxide-series resin is, for example, about 300 to $30 \times 10^4$, preferably about 400 to $10 \times 10^4$, and more preferably about 500 to $5 \times 10^4$.

(2) Polyphenylene Sulfide-series Resin

The polyphenylene sulfide-series resin (polyphenylene thioether-series resin) includes a homopolymer or copolymer having a polyphenylene sulfide backbone, —(Ar—S—)— (wherein Ar represents a phenylene group). As the phenylene group (—Ar—), there may be mentioned, for example, p-phenylene group, m-phenylene group, o-phenylene group, a substituted phenylene group (e.g., an alkylphenylene group having substituent(s) such as a $C_{1-5}$alkyl group, an arylphenylene group having substituent(s) such as phenyl group), p,p'-diphenylenesulfone group, p,p'-biphenylene group, p,p'- diphenylene ether group, and p,p'-diphenylenecarbonyl group. The polyphenylene sulfide-series resin may be a homopolymer obtained from a homogeneous repeating unit among the phenylene sulfide groups comprising such a phenylene group, the polyphenylene sulfide-series resin or in view of workability of the composition, may be a copolymer containing a heterogeneous repeating unit among the phenylene sulfide groups comprising such a phenylene group.

As the homopolymer, a substantially linear polymer comprising p-phenylene sulfide group as a repeating unit is preferably used. The copolymer may be obtained from two or more different kinds of phenylene sulfide groups among the phenylene sulfide groups. Among them, a copolymer comprising p-phenylene sulfide group as a main repeating unit in combination with m-phenylene sulfide group is preferred. From the viewpoint of physical properties such as heat resistance, moldability, and mechanical property, a substantially linear copolymer comprising not less than 60 mol % (preferably 70 mol %) of p-phenylene sulfide group is particularly preferred.

The polyphenylene sulfide resin may be a polymer obtained by allowing a relatively low molecular weight of a linear polymer to crosslink with oxidation or heating for increasing the melt viscosity of the polymer thereby improving molding processability (mold-processability), or a high molecular weight polymer having a substantially linear structure which polymer is obtained by condensation polymerization from a monomer mainly comprising a bifunctional monomer. From the viewpoint of physical properties of the resultant shaped article, a polymer having a substantially linear structure, which is obtained by condensation polymerization is more preferred. Moreover, as the polyphenylene sulfide resin, in addition to the above-mentioned polymer, a branched or crosslinked polyphenylene sulfide resin obtained by a polymerization of the monomer in combination with a monomer having not less than three of functional groups, or a resin composition obtained by blending the resin to the above-mentioned linear polymer may be also used.

As the polyphenylene sulfide-series resin, there may be used a polyphenylene sulfide (e.g., a poly-1,4-phenylene sulfide) or a polybiphenylene sulfide (PBPS), in addition a polyphenylene sulfide ketone (PPSK), a polybiphenylene sulfide sulfone (PPSS), or others. These polyphenylene sulfide-series resins may be used singly or in combination.

The number average molecular weight of the polyphenylene sulfide-series resin is, for example, about 300 to $30 \times 10^4$, preferably about 400 to $10 \times 10^4$, and more preferably about 500 to $5 \times 10^4$.

(B2) Phosphoric Ester

Examples of the phosphoric ester include a monomeric phosphoric ester [a phosphoric ester (or phosphate), a phosphorous ester (or phosphite), a hypophosphorous ester (or hypophosphite)], and a polymeric (condensed) phosphoric ester.

As the phosphoric ester, there may be mentioned an aliphatic phosphoric ester [for example, a $triC_{1-10}$alkyl phosphate such as trimethyl phosphate, triethyl phosphate, tripropyl phosphate, triisopropyl phosphate, tributyl phosphate, triisobutyl phosphate, and pentaerythritol phosphate [e.g., NH-1197 (manufactured by Great Lakes Chemical Corporation), a bicyclophosphoric ester described in Japanese Patent Application Laid-Open No. 106889/2001 (JP-2001-106889A)]; a $diC_{1-10}$alkyl phosphate and $monoC_{1-10}$alkyl phosphate corresponding to the above-mentioned phosphoric triester], an aromatic phosphoric ester [for example, a $triC_{6-20}$aryl phosphate such as triphenyl phosphate, tricresyl phosphate, trixylyl phosphate, diphenyl cresyl phosphate, tri(isopropylphenyl)phosphate and diphenyl ethylcresyl phosphate], an aliphatic-aromatic phosphoric ester (e.g., methyl diphenyl phosphate, phenyl diethyl phosphate, a polyphenol (a cyclic alkylene glycol phosphate) [e.g., resorcinol bis(neopentylene glycol phosphate), hydroquinone bis(neopentylene glycol phosphate), bisphenol bis(neopentylene glycol phosphate), bisphenol-A bis(neopentylene glycol phosphate)], a spiro ring-containing aromatic phosphoric ester (e.g., diphenyl pentaerythritol diphosphate, dicresyl pentaerythritol diphosphate, dixylyl pentaerythritol diphosphate)], and others.

The phosphorous ester (or phosphite) includes, for example, various phosphorous esters such as an aromatic phosphorous ester (e.g., a $triC_{6-20}$aryl phosphite in which aryl groups are phenyl, cresyl, xylyl group, or other group), an aliphatic phosphorous ester (e.g., a $triC_{1-10}$alkyl phosphite in which alkyl groups are methyl, ethyl, propyl, isopropyl, butyl, or isobutyl group; a di- or $monoC_{1-10}$alkyl phosphite corresponding to the above-mentioned trialkyl phosphite), an organic phosphorous ester [for example, a $diC_{1-6}$alkyl ester of a $C_{1-6}$alkylphosphorous acid (an ester of a spiro ring-containing alkylphosphorous acid such as pentaerythritol bis(methylphosphonate), pentaerythritol bis(ethylphosphonate), pentaerythritol bis(propylphosphonate), and pentaerythritol bis(butylphosphonate)); a diester of an alkylphosphorous acid such as a $diC_{6-10}$aryl ester of a $C_{1-6}$alkylphosphorous acid and a $C_{1-6}$alkyl$C_{6-10}$aryl ester of a $C_{1-6}$alkylphosphorous acid, of which the alkyl group is the above-exemplified alkyl group; a diester of $C_{6-10}$aryl-phosphorous acid corresponding to the above-mentioned diester of an alkylphosphorous acid (e.g., an ester of a spiro ring-containing arylphosphorous acid such as pentaerythritol bis(phenylphosphonate) and pentaerythritol bis(tolylphosphonate)); a $C_{6-10}$arylphosphorous monoester (e.g., 10-hydroxy-9,10-dihydro-9-oxa-10-phosphaphenanthrene-10-oxide); and a phosphonocarboxylate (a phosphonocarboxylic triester such as a $C_{1-4}$alkoxycarbonyloxy$C_{1-4}$alkylphosphorous diester corresponding to the above-mentioned alkylphosphorous diester, e.g., dimethyl methoxycarbonylmethylphosphonate)]. Moreover, the phosphorous ester also includes a metal salt (for example, a Ca, Mg, Zn, Ba, or Al salt) of a (cyclic)phosphorous monoester, or phosphonocarboxylic acid, each of which may have substituent(s) such as an alkyl group or an aryl group (e.g., an alkylphosphorous acid, a monoalkyl alkylphosphite, a monoaryl alkylphosphite, an arylphosphorous acid, a monoalkyl arylphosphite, a monoaryl arylphosphite). For example, the details about representative compounds of such a metal salt of an organic phosphorous acid may be referred to Japanese Patent Application Laid-Open No. 22866/1988 (JP-63-22866A), Japanese Patent Application Laid-Open No. 226891/1989 (JP-1-226891A), Japanese Patent Application Laid-Open No. 234893/1992 (JP-4-234893A), Japanese Patent Application Laid-Open No. 245659/1996 (JP-8-245659A), and Japanese Patent Application Laid-Open No. 272759/1997 (JP-9-272759A).

The hypophosphorous ester (or hypophosphite) includes a hypophosphorous ester which may be substituted (mono- or disubstituted) with an alkyl group(s) such as a $C_{1-4}$alkyl group or an aryl group(s) such as a $C_{6-10}$aryl group (e.g., a $C_{1-6}$alkyl hypophosphite such as methyl hypophosphite, a $C_{6-10}$aryl hypophosphite such as phenyl hypophosphite, and a cyclic hypophosphorous ester such as 9,10-dihydro-9-oxa-10-phosphaphenanthrene-10-oxide and a 10-$C_{1-30}$alkyl- or $C_{6-20}$aryl-substituted-9,10-dihydro-9-oxa-10-phosphaphenanthrene-10-oxide). Moreover, hypophosphorous ester (or hypophosphite) also includes an ester of a phosphinicocarboxylic acid which may have a substituent such as an alkyl group or an aryl group (e.g., an ester of 3-methylphosphinicopropionic acid, an ester of 3-phenylphosphinicopropionic acid), and a homo- or copolymer thereof.

The condensed phosphoric ester (or condensed phosphate) may for example be a compound represented by the following formula (1):

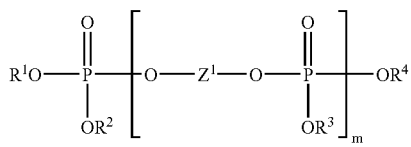

wherein $R^1$ to $R^4$ represent an aryl group which may have a substituent, $Z^1$ represents a bifunctional aromatic group, and "m" denotes an integer of not less than 1.

In the formula (1), the aryl groups represented by the $R^1$ to $R^4$ include a $C_{6-20}$aryl group (e.g., phenyl, and naphthyl), and a substituted aryl group (e.g., a tolyl group such as 4-methylphenyl, 3-methylphenyl and 2-methylphenyl groups, a xylyl group such as 3,5-dimethylphenyl, 2,4-dimethylphenyl, 2,3-dimethylphenyl and 2,6-dimethylphenyl groups, a $C_{1-4}$alkylaryl group such as ethylphenyl group, and a hydroxyphenyl group).

The bifunctional aromatic group represented by $Z^1$ may be an arylene group [e.g., a $C_{6-20}$arylene group such as a phenylene group (1,3- or 1,4-phenylene group) and a naphthylene group], a group having a plurality of the above-mentioned arylene groups [a bisphenol residue (a group which is removed hydroxyl groups from a bisphenol compound), or a biphenylene group], and others. The bisphenol of the bisphenol residue includes, for example, a bis(hydroxydiaryl)alkane [e.g., a bis(hydroxyaryl)$C_{1-6}$alkane such as bisphenol A, bisphenol D, bisphenol AD, 2,2-bis(3,5-dimethyl-4-hydroxyphenyl)propane, 1,1-bis(4-hydroxyphenyl)butane, bisphenol F, 2,2'-dihydroxydiphenylmethane, and 2,2'-diethyl-4,4'-dihydroxydiphenylmethane], a bis($C_{1-4}$alkyl-substituted hydroxyaryl)alkane [e.g., bis(3-methyl-4-hydroxyphenyl) methane, bis(3-methyl-4-hydroxyphenyl)propane, bis(3,5-dimethyl-4-hydroxyphenyl)methane, or bis(3,5-dimethyl-4-hydroxyphenyl)propane], a bis(hydroxydiaryl)cycloalkane [e.g., a bis(hydroxyaryl)$C_{3-12}$cycloalkane such as 1,1-bis(4-hydroxyphenyl)cyclohexane], a bis(hydroxyaryl)carboxylic acid [e.g., a bis(hydroxyaryl)$C_{2-6}$carboxylic acid such as bis-4,4-(hydroxyphenyl)butanoic acid], a bis(hydroxyarylalkyl) benzene [e.g., 1,4-bis(4-hydroxyphenylisopropyl)benzene], a bis(hydroxydiaryl)sulfone [e.g., bis(4-hydroxyphenyl)sulfone, bis(3,5-dimethyl-4-hydroxyphenyl)sulfone], a bis(hydroxyaryl)ether [e.g., bis(4-hydroxyphenyl)ether, bis(3,5-dimethyl-4-hydroxyphenyl)ether, 4,4'-dihydroxydiphenyl ether], a bis(hydroxyaryl)ketone [e.g., 4,4'-dihydroxybenzophenone, 3,3',5,5'-tetramethyl-4,4'-dihydroxybenzophenone], a bis(hydroxyaryl)sulfide [e.g., bis(4-hydroxyphenyl) sulfide, bis(3-methyl-4-hydroxyphenyl)sulfide], a bis (hydroxyaryl)sulfoxide [e.g., bis(4-hydroxyphenyl) sulfoxide], a dihydroxydiphenyl [e.g., 4,4'-dihydroxybiphenyl, 2,2'-biphenol], a di(hydroxyphenyl) thioether [e.g., bis(4-hydroxyphenyl)thioether], a terpenediphenol [e.g., 1,4-di($C_{1-4}$alkyl-substituted hydroxyphenyl)-p-menthane], and others.

The compound represented by the formula (1) includes, for example, a resorcinol phosphate [e.g., a condensate of resorcinol and phenyl phosphate, a condensate of resorcinol and cresyl phosphate, a condensate of resorcinol and xylenyl phosphate], a hydroquinone phosphate (e.g., a condensate of hydroquinone and phenyl phosphate, a condensate of hydroquinone and cresyl phosphate, a condensate of hydroquinone and xylenyl phosphate), a biphenol phosphate (e.g., a condensate of biphenol and phenyl phosphate, a condensate of biphenol and cresyl phosphate, a condensate of biphenol and xylenyl phosphate), a bisphenol phosphate (e.g., a condensate of bisphenol A and phenyl phosphate, a condensate of bisphenol A and cresyl phosphate, a condensate of bisphenol A and xylenyl phosphate), and others.

For example, the condensate may be obtained by allowing an aromatic dihydroxy compound (e.g., resorcinol, hydroquinone, a bisphenol compound) and an oxyhalogenated phosphorus (e.g., phosphoryl chloride) to condense, and esterifying the condensed product with a hydroxyaryl compound (e.g., phenol, cresol, xylenol, naphthol).

In the formula (1), "m" is an integer of not less than 1 (e.g., about 1 to 200), preferably about 1 to 100, and more preferably about 1 to 30.

Moreover, the polymeric phosphoric ester may be a phosphoric ester of a polymer having a hydroxyl group (such as a phenolic resin). Such a phosphoric ester of a polymer includes, for example, a polymer having a structural unit represented by the following formula (2):

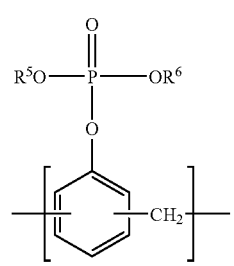

wherein $R^5$ and $R^6$ represent an aryl group.

The aryl group includes the above-exemplified aryl group (a $C_{6-20}$aryl group, in particular phenyl group) and a substituted aryl group (an alkyl-substituted aryl group).

Moreover, the phosphoric ester also includes a nitrogen-containing phosphoric ester having a partial structure of the phosphoric ester, for example, a phosphazene [a chain and/or cyclic phenoxyphosphazene; an aryloxyphosphazene modified with a polyhydric phenol (a polyhydroxyphenol such as hydroquinone, resorcinol, and phloroglucin; a biphenol, and a bisphenol (e.g., bisphenol A)), e.g., phenoxyphosphazene, tolyloxyphosphazene, and tolyloxyphenoxyphosphazene]; and a phosphoric ester amide (e.g., compounds described in Japanese Patent Application Laid-Open No. 226547/2002 (JP-2002-226547A), Japanese Patent Application Laid-Open No. 354684/2001 (JP-2001-354684A), Japanese Patent Application Laid-Open No. 327834/2000 (JP-2000-327834A), Japanese Patent Application Laid-Open No. 139823/2001 (JP-2001-139823A), Japanese Patent Application Laid-Open No. 154277/2000 (JP-2000-154277A), Japanese Patent Application Laid-Open No. 175985/1998 (JP-10-175985A), Japanese Patent Application Laid-Open No. 59888/1996 (JP-8-59888A), Japanese Patent Application Laid-Open No. 2353/1988 (JP-63-2353A), Japanese Patent Application Laid-Open No. 19919/1979 (JP-54-19919A), and others). Such a phosphoric ester amide is commercially available as trade name "PHOSPHORIC ESTER AMIDE FLAME RETARDANT SP SERIES (e.g., SP-601, SP-670, SP-703, and SP-720)" [manufactured by Shikoku Chemicals Corp.].

Moreover, the phosphonitrilic compound also includes a branched or crosslinked derivative modified with a polyhydric phenol [for example, a polyhydroxyphenol such as hydroquinone, resorcinol, and phloroglucinol; biphenol, a bisphenol (e.g., bisphenol A)], e.g., a phenoxyphosphazene modified with the above-mentioned polyhydric phenol.

These phosphoric esters (B2) may be used singly or in combination. In the present invention, the condensed phosphoric ester, particularly a compound represented by the formula (1), is preferred as the phosphoric ester.

(B3) Nitrogen-containing Cyclic Compound

The nitrogen-containing cyclic compound includes (a) a nitrogen-containing cyclic compound having an amino group, (b) a salt of a nitrogen-containing cyclic compound having an amino group with an oxygen acid (oxyacid), (c) a salt of a nitrogen-containing cyclic compound having an amino group with an organic phosphoric acid, (d) a salt of a nitrogen-containing cyclic compound having an amino group with a nitrogen-containing cyclic compound having a hydroxyl group, (e) a polyphosphoric acid amide, (f) a cyclic compound having a urea unit (or cyclic urea compound), and others.

(a) Nitrogen-containing Cyclic Compound Having Amino Group

The nitrogen-containing cyclic compound having an amino group includes a heterocyclic compound having at least one amino group and at least one nitrogen atom as a hetero atom of a heterocycle. The heterocycle may have other hetero atom(s) such as sulfur and oxygen other than nitrogen. Such a nitrogen-containing heterocycle includes a 5- or 6-membered unsaturated nitrogen-containing heterocycle having a plurality of nitrogen atoms as constituent atoms thereof, for example, imidazole, thiadiazole, thiadiazoline, furazan, triazole, thiadiazine, pyrazine, pyrimidine, pyridazine, triazine, and purine. Among such nitrogen-containing rings, a 5- or 6-membered unsaturated nitrogen-containing ring having a plurality of nitrogen atoms as constituent atoms thereof is preferred, and in particular, triazole and triazine are preferred.

As the triazole compound, there may be mentioned a 1,2,3-triazole (e.g., a 1H-1,2,3-triazole; a 2H-1,2,3-triazole), a 1,2,4-triazole (e.g., a 1H-1,2,4-triazole such as guanazole; a 4H-1,2,4-triazole such as guanazine), and the like. The arbitrary site(s) of a triazole ring (nitrogen atom and carbon atom, in particular carbon atom) may have an amino group(s) as substituent(s). The number of the amino group is not particularly limited to a specific one, and is about 1 to 3, and particularly about 1 to 2.

The triazine compound includes a variety of aminotriazines: a 1,3,5-triazine [for example, a melamine or a derivative thereof such as melamine, a substituted melamine (e.g., an alkylmelamine such as 2-methylmelamine, guanylmelamine), a condensation product of a melamine (melamine condensate) (e.g., melam, melem, melon), and a copolycondensed resin of a melamine (e.g., a melamine-formaldehyde resin, a phenol-melamine resin, a benzoguanamine-melamine resin, an aromatic polyamine-melamine resin); a cyanuric amide (e.g., ammeline, ammelide); a guanamine or a derivative thereof (e.g., guanamine, methylguanamine, acetoguanamine, benzoguanamine, succinoguanamine and CTU-guanamine)], an amino group-containing 1,2,3-triazine (e.g., 1,2,3-triazine having an amino group(s) as substituent(s) at 5-position, 4,5-positions or 4,5,6-positions, 4-amino-benzo-1,2,3-triazine), and an amino group-containing 1,2,4-triazine (e.g., 1,2,4-triazine having an amino group(s) as substituent(s) at 3-position, 5-position or 3,5-positions). The arbitrary site(s) of a triazine ring (nitrogen atom and carbon atom, particularly carbon atom) may have an amino group(s) as substituent(s). The number of the amino group is not particularly limited to a specific one, and is about 1 to 4, especially about 1 to 3 (for example about 1 to 2).

Among them, the amino group-containing triazine compound, particularly the amino group-containing 1,3,5-triazine, is preferred.

(b) Salt of Nitrogen-containing Cyclic Compound Having Amino Group with Oxygen Acid As the nitrogen-containing cyclic compound having an amino group, there may be used a nitrogen-containing cyclic compound the same as the above-mentioned (a).

The nitrogen-containing cyclic compound having an amino group may form a salt with an oxygen acid at a nitrogen atom site (imino group) constituting a ring. It is usually preferred to form a salt of an oxygen acid with at least one amino group which is a substituent of a ring of the cyclic compound. In the case having a plurality of amino groups, all amino groups may form a salt with the oxygen acid. Moreover, a plurality of nitrogen-containing cyclic compounds which are the same or different kind (the above-mentioned nitrogen-containing cyclic compound, or other nitrogen-containing cyclic compound which contains an amino group) may form a salt with one polyacid to form a double salt (or complex salt) of a polyacid.

(Oxygen Acid)

The oxygen acid includes nitric acid, a chloric acid (such as perchloric acid, chloric acid, chlorous acid, hypochlorous acid), a phosphoric acid, a sulfuric acid, a sulfonic acid, a boric acid, a chromic acid, an antimonic acid, a molybdic acid, a tungstic acid, a stannic acid, and silicic acid. The preferred oxygen acid includes a phosphoric acid (polyphosphoric acid), a sulfuric acid, a sulfonic acid, and a boric acid.

(1) Phosphate of Nitrogen-Containing Cyclic Compound Having Amino Group

The phosphoric acid includes a non-condensed phosphoric acid such as peroxyphosphoric acid, orthophosphoric acid, metaphosphoric acid, phosphorous acid (phosphonic acid), and hypophosphorous acid (phosphinic acid); a condensed phosphoric acid (polyphosphoric acid) such as a polymetaphosphoric acid $(HPO_3)_r$ (wherein, "r" shows an integer of not less than 2), hypophosphoric acid, and phosphoric anhydride (diphosphorus pentaoxide). Moreover, the polyphosphoric acid also includes a condensed phosphoric acid represented by the following formula (3):

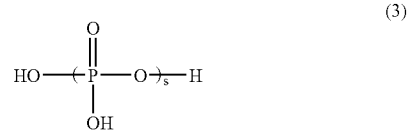

(3)

wherein "s" denotes an integer of not less than 2.

In the formula, "s" represents a degree of condensation of the polyphosphoric acid. The number "s" may just be an integer of not less than 2, and is preferably an integer of 2 to 200 (e.g., about 3 to 200), and more preferably an integer of 3 to 100.

Moreover, the polyphosphoric acid also includes pyrophosphoric acid, triphosphoric acid, tetraphosphoric acid, and others.

In a phosphoric acid having a plurality of salifiable sites, at least part of the sites may form a partial salt with other amino group-containing compound such as an amine or a urea (e.g., a partial salt of a condensed acid such as an ammonium polyphosphate and a urea polyphosphate; and a partial salt of non-condensed acid such as a urea orthophosphate).

As a phosphate of a nitrogen-containing cyclic compound having an amino group, there may be exemplified a phosphate of an amino group-containing triazine compound, for example, a non-condensed phosphate (e.g., a melamine salt of a non-condensed phosphoric acid such as melamine orthophosphate and melamine phosphite; a melem, melam, melon and guanamine salt corresponding to the melamine salt), a polyphosphate [e.g., a melamine pyrophosphate (melamine pyrophosphate, dimelamine pyrophosphate), a melamine polyphosphate (such as a triphosphate and tetraphosphate) corresponding to the melamine pyrophosphate; and a melem, melam, melon and guanamine salt corresponding to the melamine polyphosphate]. Moreover, the polyphosphate may contain a sulfur atom derived from sulfuric acid. There may be also used a triazole salt corresponding to the above-mentioned triazine salt.

The polyphosphate also includes a double salt (complex salt) of polyphosphoric acid with melamine, melam and melem (or a melamine-melam-melem double salt of polyphosphoric acid), a melamine-melam-melem double salt of metaphosphoric acid, in addition a melamine-melam-melem double salt of the above-mentioned polyacid containing a sulfur atom (a polyacid containing a sulfur atom, an oxygen atom and others in addition to a phosphorus atom). The details of these double salts can be referred to Japanese Patent Application Laid-Open No. 306081/1998 (JP-10-306081A), Japanese Patent Application Laid-Open No. 306082/1998 (JP-10-306082A), and others.

(2) Sulfate of Nitrogen-containing Cyclic Compound Having Amino Group

The sulfuric acid includes a non-condensed sulfuric acid such as peroxomonosulfuric acid, sulfuric acid and sulfurous acid, a condensed sulfuric acid such as peroxodisulfuric acid and pyrosulfuric acid, and others.

As a sulfate of a nitrogen-containing cyclic compound having an amino group, there may be mentioned a sulfate of an amino group-containing triazine compound, for example, a condensed sulfate [for example, a melamine salt of a non-condensed sulfuric acid such as a melamine sulfate (e.g., melamine sulfate, dimelamine sulfate, guanylmelamine sulfate), and a melamine sulfite corresponding to the melamine sulfate; and a melem salt, melam salt, melon salt or guanamine salt corresponding to the melamine salt of a non-condensed sulfuric acid)], a condensed sulfate [for example, a melamine pyrosulfate (e.g., melamine pyrosulfate, dimelamine pyrosulfate), and a melem salt, melam salt, melon salt or guanamine salt corresponding to the melamine pyrosulfate]. Moreover, a triazole salt corresponding to the triazine salt may be also used.

For example, the melamine sulfate may be obtained by a method described in Japanese Patent Application Laid-Open No. 231517/1996 (JP-8-231517A). For example, the dimelam pyrosulfate may be obtained by a method described in A.C.S. Symposium Series No. 425 "Fire and Polymers", Chapter 15, p. 211-238 (American Chemical Society, Washington D.C., 1990), Japanese Patent Application Laid-Open No. 306082/1998 (JP-10-306082A), or the like. Such a sulfate of a nitrogen-containing cyclic compound (triazine compound) is, for example, procurable from Sanwa Chemical Co., Ltd. as "Apinon 901".

(3) Sulfonate of Nitrogen-containing Cyclic Compound Having Amino Group

The sulfonic acid includes an organic sulfonic acid such as a $C_{1-10}$alkanesulfonic acid (e.g., methanesulfonic acid, ethanesulfonic acid, ethanedisulfonic acid), and a $C_{6-20}$arylsulfonic acid (e.g., benzenesulfonic acid, toluenesulfonic acid).

As the sulfonate of a nitrogen-containing cyclic compound having an amino group, there may be mentioned a sulfonate of a amino group-containing triazine compound (e.g., melamine, melam, melem, melon, guanamine, acetoguanamine, benzoguanamine) [for example, a melamine sulfonate (melamine methanesulfonate, melam methanesulfonate, melem methanesulfonate, a melamine-melam-melem double salt of methanesulfonic acid, guanamine methanesulfonate)], or others. Such an organic sulfonate of a nitrogen-containing cyclic compound (triazine compound) is, for example, procurable from Nissan Chemical Industries, Ltd. as "MELAM METHANESULFONATE MMS-200".

(4) Borate of Nitrogen-containing Cyclic Compound Having Amino Group

The boric acid includes a non-condensed boric acid such as orthoboric acid and metaboric acid; a condensed boric acid such as tetraboric acid and boric anhydride; and others.

As a borate of a nitrogen-containing cyclic compound having an amino group, there may be mentioned a borate of an amino-group containing triazine compound, for example, a non-condensed borate [a salt of an orthoboric acid such as a melamine orthoborate (a melamine orthoborate such as mono- to trimelamine orthoborate), a melem salt, melam salt, melon salt or guanamine salt corresponding to the melamine orthoborate; a metaborate corresponding to the orthoborate], a polyborate [a melamine salt of a condensed boric acid (e.g., melamine boric anhydride, melamine tetraborate), a melem salt, melam salt, melon salt or guanamine salt corresponding to the melamine borate].

Such a borate of a nitrogen-containing cyclic compound (triazine compound) is, for example, available as "melapur" from DSM, as "STORFLAM MLB" from Joseph Storey & Co LTD. or as "BUDIT 313" from Budenheim Iberica Comercial.

These salts of an oxygen acid may be used singly or in combination.

The ratio of the nitrogen-containing cyclic compound having an amino group relative to the oxygen acid is not particularly limited to a specific one, and the former/the latter (molar ratio) is, for example, about 1/20 to 20/1, preferably about 1/10 to 10/1 (e.g., about 1/5 to 10/1), and particularly about 1/2 to 8/1. The equivalence ratio of an amino group contained in the nitrogen-containing cyclic compound relative to a salifiable site of the oxygen acid is also not particularly limited to a specific one, and is, for example, about 10/1 to 1/2, preferably about 5/1 to 1/1, and particularly about 4/1 to 1/1.

(c) Salt of Nitrogen-containing Cyclic Compound Having Amino Group With Organic Phosphoric Acid As a nitrogen-containing cyclic compound having an amino group, there may be exemplified the nitrogen-containing cyclic compound having an amino group similar to the above-mentioned (a).

As the organic phosphoric acid, for example, there may be mentioned a partial ester of the non-condensed phosphoric acid exemplified in the paragraph on the foregoing (b) [e.g., a phosphoric acid (orthophosphoric acid), a phosphorous acid], and a phosphorous acid or hypophosphorous acid having a substituent organic group. The organic phosphoric acid may comprise at least one site capable of forming a salt with the nitrogen-containing cyclic compound having an amino group.

The phosphoric ester (organic orthophosphoric acid) includes a phosphoric mono- or diester of an alcohol (a mono- or polyhydric alcohol, a mono- or polyhydric phenol). The alcohol includes a monohydric alcohol (in particular a $C_{1-10}$ aliphatic monool) and an aliphatic polyol exemplified in the paragraph on the polyarylate-series resin, in addition a $C_{1-10}$aliphatic polyol such as glycerol and pentaerythritol; a $C_{2-10}$aliphatic polyol having a hetero atom, such as nitrilotrimethanol; a $C_{5-8}$alicyclic monool such as cyclopentanol and cyclohexanol (preferably a $C_{5-6}$cycloalkanol); a $C_{5-8}$alicyclic diol such as cyclohexanediol (preferably a $C_{5-6}$cycloalkanediol); a monohydric phenol such as phenol, an alkylphenol (e.g., a mono- to tri$C_{1-20}$alkylphenol such as p- or m-cresol, 3,5-xylenol, trimethylphenol, t-butylphenol, p-octylphenol, and nonylphenol), an arylphenol (e.g., phenylphenol, benzylphenol, cumylphenol), naphthol, or hydroxybiphenyl; a monohydric aralkyl alcohol and aromatic cyclic diol exemplified in the paragraph on the polyarylate-series resin, and others.

Such a phosphate includes a mono- or di$C_{1-10}$alkyl phosphate such as methyl phosphate and dibutyl phosphate; a mono- to tetraphosphate of a $C_{2-10}$ aliphatic polyhydric alcohol such as ethylene glycol monophosphate and pentaerythritol bisphosphate; a phosphate of a monohydric phenol which may have a substituent (such as a $C_{1-4}$alkyl group) (e.g., a mono- or di$C_{6-14}$aryl phosphate which may have a $C_{1-4}$alkyl group), such as monophenyl phosphate, monocresyl phosphate, monoxylenyl phosphate, monotrimethylphenyl phosphate, diphenyl phosphate, dicresyl phosphate, dixylenyl phosphate and ditrimethylphenyl phosphate; a mono- or diphosphate of a polyhydric phenol which may have a substituent (such as a $C_{1-4}$alkyl group) (e.g., a $C_{6-14}$arylene mono- or diphosphate which may have a $C_{1-4}$alkyl group), such as phenylene bisphosphate; an alkyl-aryl phosphate [e.g., a $C_{1-10}$ alkyl $C_{6-14}$aryl phosphate such as methyl phenyl phosphate (preferably a $C_{1-6}$alkyl $C_{6-10}$aryl phosphate)].

The organic phosphorous acid includes a phosphorous monoester corresponding to the above-mentioned phosphate, an organic phosphorous acid in which a hydrogen atom directly bonded to a phosphorus atom of phosphorous acid is substituted by an organic group (such as an aliphatic hydrocarbon group, an alicyclic hydrocarbon group, an aromatic hydrocarbon group), an organic phosphorous monoester of the alcohol, and others.

The organic phosphorous acid includes an aliphatic phosphorous acid [e.g., an alkylphosphorous acid such as methylphosphorous acid, ethylphosphorous acid, propylphosphorous acid and butylphosphorous acid; a mono or diphosphorous ester of an aliphatic polyol such as 1-hydroxyethylidene-1-phosphorous acid and 1-hydroxyethylidene-1, 1-diphosphorous acid; a $C_{1-10}$ alkyl-substituted phosphorous acid in which the $C_{1-10}$ alkyl group may have a substituent (e.g., a hydroxyl group, a carboxyl group, an ester group), for example, a phosphonocarboxylic acid such as a phosphono$C_{1-10}$aliphatic carboxylic acid (e.g., a phosphonoacetic acid, 3-phosphonopropionic acid) or a carboxylic ester thereof (e.g., a carboxylate of a phosphonocarboxylic acid such as ethyl phosphonoacetate and ethyl 3-phosphonopropionate) (preferably a $C_{1-6}$ alkyl-substituted phosphorous acid); a $C_{1-10}$ alkylenediphosphorous acid such as ethylenebisphosphorous acid; a phosphorous acid which has a substituent aliphatic polyfunctional group having a hetero atom such as nitrilotris(methylphosphorous acid) (or [nitrilotris(methylene)]trisphosphorous acid)], an aromatic phosphorous acid [for example, a $C_{6-10}$ arylphosphorous acid such as phenylphosphorous acid and tolylphosphorous acid; a phosphonocarboxylic acid such as a phosphono$C_{7-15}$aromatic carboxylic acid (such as phosphonobenzoic acid) or a carboxylic ester thereof (e.g., a carboxylate of a phosphono aromatic carboxylic acid such as ethyl phosphonobenzoate); a phosphorous acid having a substituent aromatic polyfunctional group which may have a substituent (e.g., a $C_{1-4}$alkyl group), such as phenylenebisphosphorous acid]; and the like. Moreover, the organic phosphorous acid may be a phosphorous acid bonded to a polymer (e.g., a polyvinylphosphorous acid).

The organic phosphorous monoester includes a monoester of the above-mentioned organic phosphorous acid with the alcohol exemplified in the item on the above-mentioned phosphate, for example, a $C_{1-10}$ alkylphosphorous acid mono$C_{1-6}$alkyl ester such as methylphosphorous acid monomethyl ester; a phosphonocarboxylic acid diester (a $C_{2-6}$alkoxycarbonyl$C_{1-6}$alkylphosphorous mono$C_{1-6}$alkyl ester such as monoethyl ethoxycarbonylmethylphosphite or monoethyl ethoxycarbonylethylphosphite); a $C_{1-10}$ alkylphosphorous mono$C_{6-10}$aryl ester such as methylphosphorous monophenyl ester; a $C_{6-10}$arylphosphorous $C_{1-6}$alkyl ester such as phenylphosphorous monomethyl ester; and a $C_{6-10}$arylphosphorous mono$C_{6-10}$aryl ester such as phenylphosphorous monophenyl ester. Incidentally, the phosphorous ester may be a cyclic phosphorous ester (e.g., 9,10-dihydro-10-hydroxy-10-oxo-9-oxa-10-phosphaphenanthrene).

The organic hypophosphorous acid includes an organic hypophosphorous acid in which an organic group (hydrocarbon group such as an aliphatic hydrocarbon group, an alicyclic hydrocarbon group and an aromatic hydrocarbon group) is bonded to phosphorus atom of the hypophosphorous acid. As such a organic hypophosphorous acid, there may be mentioned a substituted hypophosphorous acid corresponding to the substituted phosphorous acid, for example, a mono- or di$C_{1-10}$alkylhypophosphorous acid such as methylethylhypophosphorous acid and diethylhypophosphorous acid; a $C_{1-10}$ alkyl$C_{6-10}$ arylhypophosphorous acid such as methylphenylhypophosphorous acid; a $C_{6-10}$ arylhypophosphorous acid such as phenylhypophosphorous acid; a phosphinicocarboxylic acid [e.g., a phosphinicodi$C_{1-6}$aliphatic carboxylic acid such as phosphinicodiacetic acid; a $C_{1-6}$alkylphosphinico-mono$C_{1-6}$ aliphatic carboxylic acid such as 3-(methylphosphinico)propionic acid, a $C_{6-10}$ arylphosphinico-mono$C_{1-6}$aliphatic carboxylic acid such as 3-(phenylphosphinico)propionic acid, a carboxylic ester of the phosphinicocarboxylic acid; a phosphinicomono- or di$C_{6-10}$arylcarboxylic acid or an carboxylic ester thereof]; a hydroxyphosphine oxide (e.g., 1-hydroxydihydrophosphonyl oxide, 1-hydroxyphosphorane oxide); and others.

The organic phosphate may be a salt of the nitrogen-containing cyclic compound having an amino group at part or whole of salifiable site(s), and both of the salts may be used. Such an organic phosphate includes a salt of an amino group-containing triazine compound, for example, a melamine salt of an organic phosphoric ester (e.g., salt of pentaerythritol bisphosphate with melamine, salt of pentaerythritol bisphosphate with dimelamine), a melamine salt of a $C_{1-6}$alkyl-substituted phosphorous acid, a melamine salt of a mono- or diphosphorous ester of a $C_{1-6}$aliphatic diol (e.g., salt of 1-hydroxyethylidene-1,1-diphosphorous acid with dimelamine, salt of 1-hydroxyethylidene-1,1-diphosphorous acid with tetramelamine), a melamine salt of a phosphorous acid which has a substituent aliphatic polyfunctional group having a hetero atom [e.g., tetramelamine salt of nitrilotris(methylphosphonic acid), hexamelamine salt of nitrilotris(methylphosphonic acid)], and a melamine salt of a $C_{6-10}$arylphosphorous acid, (melamine salt of phenylphosphorous acid, dimelamine salt of phenylphosphorous acid), a melamine salt of a phosphinicocarboxylic acid (a melamine salt of an arylphosphinicocarboxylic acid such as melamine salt of 3-(phenylphosphinico)propionic acid and dimelamine salt of 3-(phenylphosphinico)propionic acid); a melem salt, a melam salt, a melon salt or a guanamine salt, each corresponding to the melamine salt; and a double salt corresponding to the melamine salt, such as salt of pentaerythritol bisphosphate with melamine and melem). Moreover, a triazole salt corresponding to the above-mentioned salt of a triazine compound may be also used. Such an organic phosphate may be used singly or in combination.

A production method of such an organic phosphate of a nitrogen-containing cyclic compound having an amino group (in particular, an amino group-containing triazine compound) is not particularly limited to a specific one, and for example comprises stirring and mixing a solution or dispersion liquid containing the nitrogen-containing cyclic compound and the organic phosphoric acid (e.g., an aqueous solution or suspension such as a water-acetone mixed system and a water-alcohol mixed system) at an appropriate temperature (for example, about 50 to 100° C.), and separating and drying the produced precipitate to give an object product.

(d) Salt of Nitrogen-containing Cyclic Compound Having Amino Group with Nitrogen-containing Cyclic Compound Having Hydrogen Group As a nitrogen-containing cyclic compound having an amino group, there may be mentioned the nitrogen-containing cyclic compound having an amino group similar to the above-mentioned (a).

A nitrogen-containing cyclic compound having a hydroxyl group includes a compound composed of at least one hydroxyl group and a heterocycle having at least one nitrogen atom as a hetero atom thereof. As the heterocycle, there may be mentioned a heterocycle corresponding to the above nitrogen-containing cyclic compound having an amino group. The preferred nitrogen-containing ring is a 5- or 6-membered unsaturated nitrogen-containing ring having a plurality of nitrogen atoms as constituent atoms of the ring, in particular triazine, as described above.

As the triazine compound, there may be mentioned a hydroxyl group-containing triazine compound corresponding to the triazine compound exemplified in the item on the nitrogen-containing cyclic compound having an amino group. The arbitrary site(s) of a triazine ring (nitrogen atom and carbon atom, particularly carbon atom), e.g., 2-position, 3-position, 4-position, 5-position, 2,4-position, 3,5-position, 4,5-position, 2,4,6-position, or 4,5,6-position, may have a hydroxyl group(s) as substituent(s). The number of the hydroxyl group is not particularly limited to a specific one, and is about 1 to 4, and particularly about 1 to 3 (e.g., about 2 to 3). The preferred hydroxyl group-containing triazine compound includes a hydroxyl group-containing 1,3,5-triazine, in particular a cyanuric acid or a derivative thereof such as cyanuric acid, ammeline, and ammelide.

The salt of the nitrogen-containing cyclic compound having an amino group with the nitrogen-containing cyclic compound having a hydroxyl group includes a salt of a triazine with a cyanuric acid or a derivative thereof, for example, a melamine salt of cyanuric acid such as melamine cyanurate; and a melem salt, melam salt, melon salt or guanamine salt (e.g., guanamine cyanurate, acetoguanamine cyanurate, benzoguanamine cyanurate) corresponding to the melamine salt.

These salts may be used singly or in combination.

The ratio of the nitrogen-containing cyclic compound having an amino group relative to the nitrogen-containing cyclic compound having a hydroxyl group is not particularly limited to a specific one, and for example the former/the latter (molar ratio) is about 1/2 to 3/1, and preferably about 1/1 to 2/1.

(e) Polyphosphoric Acid Amide

The polyphosphoric acid amide is a polymer compound containing a nitrogen of an amide form and includes a condensate of a phosphoric acid exemplified in the paragraph on the oxygen acid and a compound having a unit represented by —N=C=N— or —N=C(—N<)$_2$ (such as a cyanamide derivative). Such a polyphosphoric acid amide is usually obtained by heating (such as burning) the above-mentioned phosphoric acid and the cyanamide derivative in the presence of at least one member (or binding agent) selected from a urea and a urea polyphosphate.

As the above-mentioned phosphoric acid, it is preferred to use a non-condensed phosphoric acid (e.g., orthophosphoric acid, metaphosphoric acid), a polyphosphoric acid, a partial ester of a phosphoric acid (e.g., ammonium polyphosphate, urea phosphate) or the like. These phosphoric acids may be used singly or in combination.

The cyanamide derivative includes a cyclic cyanamide derivative such as an amino group-containing triazine (e.g., an amino group-containing 1,3,5-triazine such as melamine, melam, melem, melon, guanamine, acetoguanamine, or benzoguanamine, an amino group-containing 1,2,4-triazine such as 3-amino-1,2,4-triazine) and an amino group-containing triazole (e.g., an amino group-containing 1,3,4-triazole such as 2,5-diamino-1,3,4-triazole); a noncyclic cyanamide derivative such as a guanidine compound [e.g., guanidine, a guanidine derivative such as dicyandiamide or guanylurea)]; or others. The preferred cyanamide derivative includes an amino group-containing 1,3,5-triazine, and guanidine or a derivative thereof, in particular melamine. Such a cyanamide derivative may be used singly or in combination.

These polyphosphoric acid amides may be used singly or in combination. For example, the polyphosphoric acid amide may be referred to Japanese Patent Application Laid-Open No. 138463/1995 (JP-7-138463A). Such a polyphosphoric acid amide may be produced by methods described in Japanese Patent Publication No. 2170/1978 (JP-53-2170B), Japanese Patent Publication No. 15478/1978 (JP-53-15478B), Japanese Patent Publication No. 49004/1980 (JP-55-49004B), Japanese Patent Application Laid-Open No. 126091/1986 (JP-61-126091A), Japanese Patent Application Laid-Open No. 81691/1998 (JP-10-81691A), U.S. Pat. No. 4,043,987, or others. The polyphosphoric acid amide is commercially available as "SUMISAFE PM" (manufactured by Sumitomo Chemical Co., Ltd.), "Taien S" (manufactured by Taihei Chemical Industrial Co., Ltd.), "MPP" (manufactured by Sanwa Chemical Co., Ltd.), "Melapur" (manufactured by DSM), "Exolit" (manufactured by Clariant Ltd.), and "AMGARD" (manufactured by Albright & Wilson Corp.).

These polyphosphoric acid amides may be treated with the use of a surface-modifying agent such as an epoxy-series compound, a coupling agent (e.g., a silane-series compound, a titanate-series compound, an aluminum-series compound), and a chromium-series compound. Moreover, the polyphosphoric acid amide may be coating-treated with a metal, a glass, a cyanurate of a triazine derivative, a thermosetting resin (e.g., a phenol resin, a urea resin, a melamine resin, an aniline resin, a furan resin, a xylene resin, or a co-condensed resin thereof, an unsaturated polyester resin, an alkyd resin, a vinylester resin, a diallylphthalate resin, an epoxy resin, a polyurethane resin, a silicon-containing resin, a polyimide), a thermoplastic resin, or the like. Among these coat-treatments, the polyphosphoric acid amide is usually coating-treated with a thermosetting resin (e.g., a phenol resin, an epoxy resin). For example, a coat-treatment method for the polyphosphoric acid amide may be referred to Japanese Patent Application Laid-Open No. 125489/1977 (JP-52-125489A), Japanese Patent Application Laid-Open No. 21704/1987 (JP-62-21704A), Japanese Patent Application Laid-Open No. 110254/1988 (JP-63-110254A), Japanese Patent Application Laid-Open No. 53569/1996 (JP-8-53569A), Japanese Patent Application Laid-Open No. 53574/1996 (JP-8-53574A), Japanese Patent Application Laid-Open No. 169120/2000 (JP-2000-169120A), Japanese Patent Application Laid-Open No. 131293/2001 (JP-2001-131293A), and others. The proportion of the polyphosphoric acid amide relative to a coating component is not particularly limited to a specific one. For example, the coating component is about 0.1 to 20% by weight, preferably about 0.1 to 10% by weight (e.g., about 0.1 to 8% by weight) relative to a polyphosphoric acid amide to be coated.

(f) Cyclic Compound Having a Urea Unit

The cyclic compound having a urea unit (or cyclic urea compound) is not particularly limited to a specific one as far as the compound comprises at least one urea unit (—NH-CONH—) as a constituent unit of a ring thereof, and may be any of a monocyclic compound, and a condensed ring with an aromatic hydrocarbon ring or crosslinked ring. Such a cyclic urea compound includes a cyclic monoureide, a cyclic diureide, and others. Further, the cyclic urea compound also includes a cyclic thiourea corresponding to the above-mentioned cyclic urea. These cyclic urea compounds may be used singly or in combination.

As the cyclic monoureide, for example, there may be mentioned an alkyleneurea [e.g., a $C_{1-10}$ alkyleneurea such as methyleneurea, ethyleneurea and crotonylideneurea (CDU) (preferably, a $C_{1-6}$alkyleneurea)], an alkenyleneurea (e.g., a $C_{2-10}$alkenyleneurea such as vinyleneurea and cytosine), an alkynyleneurea [e.g., a $C_{2-10}$alkynyleneurea (preferably, a $C_{2-6}$alkynyleneurea)], an aryleneurea (e.g., imesatin), a ureide of a dicarboxylic acid (e.g., parabanic acid, dimethylparabanic acid, barbituric acid, 5,5-diethylbarbituric acid, dilituric acid, dialuric acid, alloxan, alloxanic acid, isocyanuric acid, uramil), a ureide of a β-aldehydic acid (e.g., uracil, 5-methyluracil (thymine), dihydrouracil, urazole, benzolyene urea), a ureide of an β-hydroxy acid [e.g., a hydantoin compound such as hydantoin, 5,5-dimethylhydantoin, 1,1-methylenebis(5,5-dimethylhydantoin) and allantoin], or a derivative thereof.

As the cyclic diureide, for example, there may be mentioned uric acid, 3-methyluric acid, pseudouric acid, acetyleneurea (glycoluril), a diureide of a α-hydroxy acid [e.g., 1,1-methylenebis(5,5-dimethylhydantoin), allantoin], a diurea such as p-urazine, a diureide of a dicarboxylic acid (e.g., alloxantin, purpuric acid), or a derivative thereof.

The cyclic thiourea includes ethylene thiourea, thiobarbituric acid, dithiourazole, thiohydantoin, dithiohydantoin, and others.

Among the cyclic urea compounds, the preferred compound includes a cyclic diureide having two urea units as a constituent unit of a ring thereof (including a cyclic thiourea having two urea units), in particular acetyleneurea, uric acid, and a derivative thereof.

Among these nitrogen-containing cyclic compounds, the preferred compound includes a double salt of a nitrogen-containing cyclic compound having an amino group with an organic phosphoric acid (e.g., a melamine polyphosphate, a melam polyphosphate, and a melem polyphosphate), a polyphosphoric acid amide, a nitrogen-containing cyclic compound having a sulfur atom derived from a sulfuric acid and/or a sulfonic acid (e.g., a melamine sulfate, a melam pyrosulfate, and a melam organic sulfonate). Further, in the case using a condensed phosphoric ester as the phosphoric ester (B2), it is preferred to use a polyphosphate of a triazine compound having an amino group and/or a polyphosphoric acid amide from the viewpoint of inhibiting a hydrolysis of a condensed phosphoric ester.

[Styrenic Resin (C)]

In the present invention, the melt flow rate of the styrenic resin (C) (at a test temperature of 200° C./a test load of 49N in JIS K7210) is about not more than 8 g/10 minutes (e.g., about 0.01 g/10 minutes to 8 g/10 minutes), preferably about 0.05 g/10 minutes to 5 g/10 minutes, and more preferably 0.1 g/10 minutes to 5 g/10 minutes (particularly about 0.5 g/10 minutes to 3 g/10 minutes). In the case where the melt flow rate is over 8 g/10 minutes, the combustion time and the growing time are not abbreviated, and further dripping phenomenon occurs to be failed to high flame retardancy.

The styrenic resin (C) includes a homo- or copolymer of an aromatic vinyl monomer. As the styrenic resin, there may be usually employed a homo- or copolymer of an aromatic vinyl monomer, and a copolymer of an aromatic vinyl monomer and at least one member selected from the group consisting of a vinyl cyanide monomer and a rubber component. Examples of the copolymer include a copolymer of an aromatic vinyl monomer and a vinyl cyanide monomer, a graft copolymer in which an aromatic vinyl monomer is grafted to a rubber component, a graft copolymer in which an aromatic vinyl monomer and a vinyl cyanide monomer are grafted to a rubber component, and others.

The aromatic vinyl-series monomer includes styrene, an alkylstyrene (e.g., a vinyltoluene such as o-, m-, p-methylstyrene, a vinylxylene such as 2,4-dimethylstyrene, an alkyl-substituted styrene such as ethylstyrene, p-isopropylstyrene, butylstyrene, or p-t-butylstyrene), an α-alkyl-substituted styrene (e.g., α-methylstyrene, α-ethylstyrene, α-methyl-p-methylstyrene), o-, m-, or p-hydroxystyrene, and others. These styrenic monomers may be used singly or in combination. The preferred styrenic monomer includes styrene, a vinyltoluene, and an α-methylstyrene, and styrene is particularly preferred.

Examples of the vinyl cyanide monomer include acrylonitrile, methacrylonitrile, and others. These vinyl cyanide monomers may be also used singly or in combination. The preferred vinyl cyanide monomer includes acrylonitrile.

As the rubber component, there may be mentioned a conjugated diene-series rubber (e.g., a polybutadiene, a polyisoprene, a styrene-butadiene copolymer, an acrylonitrile-butadiene copolymer, and an ethylene-propylene-5-ethylidene-2-norbornene copolymer), an ethylene-propylene rubber (EPDM rubber), an acrylic rubber, an ethylene-vinyl acetate copolymer, a halogenated polyolefin such as a chlorinated polyethylene, and others. The rubber component may be also a hydrogenated product. These rubber components may be used singly or in combination. As the preferred rubber component, a conjugated diene-series rubber is used in many cases. Incidentally, there is no limitation of the gel content in the rubber component such as a conjugated diene-series rubber. Moreover, the rubber component may be produced by a method such as an emulsion polymerization, a solution polymerization, a suspension polymerization, a mass polymerization, a solution-mass polymerization, and a mass-suspension polymerization.

The aromatic vinyl monomer may be further used in combination with other copolymerizable monomer(s). Examples of other copolymerizable monomer include a (meth)acrylate [e.g., a $C_{1-18}$alkyl(meth)acrylate such as methyl(meth)acrylate, ethyl(meth)acrylate, butyl(meth)acrylate, t-butyl(meth)acrylate, hexyl(meth)acrylate, octyl(meth)acrylate, and 2-ethylhexyl(meth)acrylate; a hydroxyl group-containing (meth)acrylate such as 2-hydroxyethyl(meth)acrylate, and 2-hydroxypropyl (meth)acrylate; and glycidyl(meth)acrylate], a carboxyl group-containing monomer [e.g., an unsaturated monocarboxylic acid such as (meth)acrylic acid, and crotonic acid; an aliphatic unsaturated dicarboxylic acid such as maleic anhydride, maleic acid, fumaric acid, and itaconic acid; a monoester of an unsaturated dicarboxylic acid such as a monoester of maleic acid (a mono$C_{1-10}$alkyl maleate such as monomethyl maleate, monoethyl maleate and monobutyl maleate), or a monoester of fumaric acid corresponding thereto; and others], and a maleimide-series monomer [e.g., maleimide, a N-alkylmaleimide such as N-methylmaleimide, and N-phenylmaleimide]. These copolymerizable monomers may be used singly or in combination. The preferred copolymerizable monomer includes a (meth)acrylate (particularly methyl methacrylate), glycidyl(meth)acrylate, a maleimide-series monomer, (meth)acrylic acid, maleic anhydride, and others.

In the case using the vinyl cyanide monomer, the proportion of the aromatic vinyl monomer relative to the vinyl cyanide monomer [the aromatic vinyl monomer/the vinyl cyanide monomer] is, for example, about 10/90 to 90/10 (% by weight), and preferably about 20/80 to 80/20 (% by weight).

In the case using the rubber component, the proportion of the rubber component relative to the aromatic vinyl monomer is not particularly limited to a specific one, and [the rubber component/the aromatic vinyl monomer] is about 5/95 to 80/20 (% by weight), and preferably about 10/90 to 70/30 (% by weight).

When other copolymerizable monomer is used, the composition ratio of the aromatic vinyl monomer relative to other polymerizable monomer is not limited to a specific one either, and the aromatic vinyl monomer/other copolymerizable monomer is about 100/0 to 10/90 (% by weight) (e.g., about 90/10 to 10/90 (% by weight)), and preferably about 80/20 to 20/80 (% by weight).

Moreover, the styrenic resin also includes an epoxy-modified styrenic resin which is treated with an epoxidizing agent.

Examples of the preferred styrenic resin include a polystyrene [GPPS, SPS (syndiotactic polystyrene)], an acrylonitrile-styrene copolymer (AS resin), a high impact polystyrene (HIPS), a graft polymer [e.g., an acrylonitrile-butadiene-styrene copolymer (ABS resin), an acrylonitrile-acrylic rubber-styrene copolymer (AAS resin), an acrylonitrile-chlorinated polyethylene-styrene copolymer (ACS resin), an acrylonitrile-ethylene-propylene rubber-styrene copolymer (AES resin), an acrylonitrile-butadiene rubber-methyl methacrylate-styrene graft copolymer (ABSM resin), a methyl methacrylate-butadiene-styrene copolymer (MBS resin), and an acrylonitrile-styrene-glycidyl methacrylate copolymer], a block copolymer [e.g., a styrene-butadiene-styrene (SBS) copolymer, a styrene-isoprene-styrene (SIS) copolymer, a styrene-ethylene-butylene-styrene (SEBS) copolymer, and a styrene-acrylonitrile-ethylene-propylene-ethylidene norbornene copolymer (AES)], a hydrogenerated product or epoxidized product thereof (e.g., an epoxidized SBS, and an epoxidized SIS), and others. The particularly preferred styrenic resin includes a polystyrene, a styrene-ethylene-butylene-styrene (SEBS) copolymer, an acrylonitrile-styrene copolymer (AS resin), an acrylonitrile-butadiene-styrene copolymer (ABS resin), and others. Among these styrenic resins, a polystyrene is particularly preferred. These styrenic resins may be used singly or in combination.

[Proportion of Flame Retardant]

In the present invention, the combination use of a specific flame retardant(B) with a styrenic resin (C) having a low melt flow rate imparts high flame retardancy (in particular abbreviation of combustion time and growing time, and inhibition of dripping) to a wide range of base resin even in a small amount of addition of the flame retardant. The proportion of the flame retardant relative to the base resin is not particularly limited to a specific one as far as the properties of the resin are not deteriorated. The proportion of the flame retardant is about 1 to 300 parts by weight (e.g., about 10 to 300 parts by weight), preferably about 10 to 250 parts by weight, and more preferably about 50 to 200 parts by weight, relative to 100 parts by weight of the base. The proportion of the styrenic resin (C) is about 1 to 60 parts by weight, preferably about 3 to 50 parts by weight, and more preferably about 10 to 40 parts by weight, relative to 100 parts by weight of the base resin.

The proportion (weight ratio) of the base resin (A) relative to the aromatic resin (B1) [the base resin (A)/the aromatic resin (B1)] is about 50/50 to 95/5, preferably about 60/40 to 90/10, and more preferably about 70/30 to 85/15.

The proportion of the aromatic resin (B1) in the flame retardant may be suitably selected within the range that flame retardancy can be imparted to a resin, and is about 1 to 500 parts by weight (e.g., about 10 to 500 parts by weight), preferably about 10 to 400 parts by weight, and more preferably about 50 to 350 parts by weight, relative to 100 parts by weight of the phosphoric ester (B2). Although the nitrogen-containing cyclic compound (B3) in the flame retardant is not an indispensable component as a flame retardant, the flame retardant preferably comprises the nitrogen-containing cyclic compound (B3) in order to improve flame retardancy. The proportion of the nitrogen-containing cyclic compound (B3) may be suitably selected within the range that flame retardancy can be imparted to a resin, and is about 0 to 300 parts by weight (0.1 to 300 parts by weight), preferably about 1 to 200 parts by weight, and more preferably about 5 to 180 parts by weight (in particular about 5 to 100 parts by weight), relative to 100 parts by weight of the phosphoric ester (B2).

The proportion of the nitrogen-containing cyclic compound (B3) relative to the resin component is not more than 70 parts by weight (e.g., about 0.01 to 70 parts by weight), preferably about 0.01 to 60 parts by weight (e.g., 0.05 to 50 parts by weight), more preferably about 0.1 to 40 parts by weight (in particular about 1 to 20 parts by weight), and usually about 1 to 30 parts by weight (e.g., about 1 to 15 parts by weight), relative to 100 parts by weight of the total amount of the base resin (A), the aromatic resin (B1) and the styrenic resin (C).

[(D) Inorganic Filler]

The flame-retardant resin composition of the present invention may be modified with the use of an inorganic filler to further improve mechanical strength, rigidity, thermal stability, electrical property and others. The inorganic filler includes a fibrous filler, and a non-fibrous filler (such as a plate-like one and a particulate one).

As the fibrous filler, there may be mentioned a glass fiber, an asbestos fiber, a carbon fiber, a silica fiber, a silica-alumina fiber, a zirconia fiber, a potassium titanate fiber, a metal fiber, and an organic fiber having high melting point (e.g., an aliphatic or aromatic polyamide, an aromatic polyester, a fluorine-containing resin, and an acrylic resin such as a polyacrylonitrile).

Among the non-fibrous fillers, the plate-like filler includes, for example, a glass flake, a mica, a graphite, a variety of metal foil, and others.

The particulate filler includes a carbon black, a silica, a powder of quartz, a glass bead, a glass powder, a milled fiber (such as a milled glass fiber), a silicate [e.g., a calcium silicate, an aluminum silicate, a kaolin, a talc, a clay, a diatomite, a wollastonite); a metal oxide (e.g., an iron oxide, a titanium oxide, a zinc oxide, an alumina); a metal carbonate (e.g., a calcium carbonate, a magnesium carbonate); a metal sulfate (e.g., a calcium sulfate, a barium sulfate); and a metal powder (such as a silicon carbide).

The preferred fibrous filler includes a glass fiber and a carbon fiber. The preferred non-fibrous filler includes a particulate or plate-like filler, in particular a glass bead, a mild fiber, a kaolin, a talc, a mica, and a glass flake.

Moreover, the particularly preferred inorganic filler includes a glass fiber, for example, a glass fiber having high strength and rigidity (e.g., chopped strand).

In the case using the inorganic filler, the proportion of the inorganic filler in the flame-retardant resin composition is, for example, about 0.5 to 60% by weight (e.g., about 1 to 60% by weight), preferably about 1 to 50% by weight, and more preferably about 1 to 45% by weight.

On the occasion of use of the inorganic filler, a sizing agent or surface-treatment agent may be optionally employed. Such a sizing agent or surface-treatment agent includes a functional compound. As the functional compound, there may be mentioned, for example, an epoxy-series compound, silane-series compound, a titanate-series compound, and preferably an epoxy-series compound (particularly, a bisphenol A-based epoxy resin, a novolak epoxy resin).

The inorganic filler may be size-treated or surface-treated with use of the sizing agent or surface-treatment agent. Regarding the treating of the inorganic filler, the treatment of the inorganic filler mat be carried out with adding the inorganic filler, or may be carried out precedently before addition of the inorganic filler.

Moreover, the amount of the functional surface-treatment agent or sizing agent to be used in combination with the filler is about not more than 5% by weight, and preferably about 0.05 to 2% by weight relative to the inorganic filler.

[(E) Flame-Retardant Auxiliary]

Examples of the flame-retardant auxiliary (or flame-retardant synergist) include (E1) a resinous flame-retardant auxiliary [an aromatic resin other than the aromatic resin (B1)], and (E2) an inorganic flame-retardant auxiliary (or an inorganic flame retardant).

(E1) Resinous Flame-retardant Auxiliary (Aromatic Resin)

The aromatic resin (E1) includes a polycarbonate-series resin, an aromatic nylon, a polyarylate-series resin, an aromatic epoxy resin, and a resin of which the main chain or side chain contains an aromatic ring having at least one group selected from a hydroxyl group and an amino group. These resinous flame-retardant auxiliaries may be used singly or in combination.

As the polycarbonate-series resin, there may be used the same resin as exemplified in the paragraph on the above-mentioned base resin. As the polycarbonate-series resin, an aromatic resin different in species from the base resin is usually employed.

(Aromatic Nylon)

As the aromatic nylon constituting the flame retardant, a resin different in kind from the polyamide resin of the thermoplastic resin is used. As such a resin, there may be used a compound having a unit represented by the following formula (4):

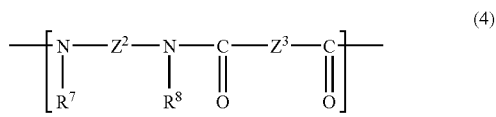

wherein $Z^2$ and $Z^3$ are the same or different, each selecting from an aliphatic hydrocarbon group, an alicyclic hydrocarbon group, and an aromatic hydrocarbon group, and at least one of $Z^2$ and $Z^3$ is an aromatic hydrocarbon group; $R^7$ and $R^8$ are the same or different, each selecting from a hydrogen group, an alkyl group, and an aryl group; and $R^7$ and $R^8$ may be connected directly with each other to form a ring.

Such an aromatic nylon includes a polyamide derived from a diamine and a dicarboxylic acid, in which at least one component of the diamine component and the dicarboxylic acid component is an aromatic compound; and a polyamide obtained from an aromatic aminocarboxylic acid, and if necessary a diamine and/or a dicarboxylic acid in combination. The aromatic nylon also includes a copolyamide derived from at least two different kinds of polyamide constituent components.

The diamine includes, for example, an aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4'-diamino-3,3'-ethylbiphenyl), adiaminehaving adiphenylalkanebackbone [e.g., diaminodiphenylmethane, bis(4-amino-3-ethylphenyl) methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof. Moreover, the aromatic diamine may be used in combination with an alicyclic diamine such as 1,3-cyclopentanediamine, 1,4-cyclohexanediamine, and bis(4-amino-3-methylcyclohexyl)methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; or others. These diamines may be used singly or in combination. As the diamine, it is preferred to use an aromatic diamine (in particular xylylenediamine, N,N'-dialkyl substituted xylylenediamine).

The dicarboxylic acid includes, for example, a $C_{2-20}$aliphatic dicarboxylic acid such as oxalic acid, malonic acid, succinic acid, glutaric acid, adipic acid, pimelic acid, suberic acid, azelaic acid, sebacic acid, undecanedicarboxylic acid, dodecanedicarboxylic acid, hexadecanedicarboxylic acid, and octadecanedicarboxylic acid; an aromatic dicarboxylic acid such as phthalic acid, phthalic anhydride, isophthalic acid, terephthalic acid, and naphthalenedicarboxylic acid; an alicyclic dicarboxylic acid such as cyclohexane-1,4-dicarboxylic acid and cyclohexane-1,3-dicarboxylic acid; a dimerized fatty acid (e.g., dimeric acid); or others. These dicarboxylic acids may be used singly or in combination. As the dicarboxylic acid, it is preferred to use an aliphatic dicarboxylic acid (in particular a $C_{6-20}$ aliphatic dicarboxylic acid such as adipic acid).

As the aromatic or alicyclic aminocarboxylic acid, there may be exemplified phenylalanine, tyrosine, anthranilic acid, aminobenzoic acid, or the like. These aminocarboxylic acids may be also used singly or in combination.

Moreover, as the aromatic nylon, a condensate of a lactam and/or an α,ω-aminocarboxylic acid may be used insofar as characteristics as a flame retardant is not deteriorated. The lactam includes a $C_{3-12}$ lactam such as propiolactam, butyrolactam, valerolactam, and caprolactam (e.g., ε-caprolactam), and others. The α,ω-aminocarboxylic acid includes 7-aminoheptanoic acid, 10-aminodecanoic acid, and others.

The accessory ingredient of other aromatic nylon includes a monobasic acid (for example, acetic acid, propionic acid, caproic acid, nicotinic acid), a monoamine (for example, ethylamine, butylamine, benzylamine), a dibasic acid (for example, adipic acid, sebacic acid, terephthalic acid, isophthalic acid, cinchomeronic acid), a diamine (for example, tetramethylenediamine, hexamethylenediamine), a lactam or others, and at least one member selected therefrom may be used as a viscosity adjustment (or viscosity controller).

The aromatic nylon includes a polyamide in which the diamine component is an aromatic compound (for example, a polyamide or copolyamide comprising xylylenediamine as a diamine component), preferably a polyamide obtained from an aromatic diamine and an α,ω(—$C_{2-12}$dicarboxylic acid [for example, a polyamide obtained from adipic acid and metaxylylenediamine (MXD6), a polyamide obtained from suberic acid and metaxylylenediamine, a polyamide obtained from adipic acid and paraxylylenediamine (PMD6), a polyamide obtained from suberic acid and paraxylylenediamine, a polyamide obtained from adipic acid and N,N'-dimethylmetaxylylenediamine, a polyamide obtained from suberic acid and N,N'-dimethylmetaxylylenediamine, a polyamide obtained from adipic acid and 1,3-phenylenediamine, a polyamide obtained from adipic acid and 4,4'-diaminodiphenylmethane, a copolyamide obtained from adipic acid, metaxylylenediamine and paraxylylenediamine, and a copolyamide obtained from adipic acid, metaxylylenediamine and N,N'-dimethylmetaxylylenediamine]. The particularly preferred aromatic nylon includes a polyamide obtained from an aromatic diamine (in particular xylylenediamine) and an α,ω-$C_{2-12}$aliphatc dicarboxylic acid, especially MXD6. These polyamides may be used singly or in combination.

The aromatic nylon is prepared by a direct method under atmospheric pressure or a melt polymerization method based on, for example, Japanese Patent Publication No. 22510/1969 (JP-44-22510B), Japanese Patent Publication No. 51480/1972 (JP-47-51480B), Japanese Patent Application Laid-Open No. 200420/1982 (JP-57-200420A), Japanese Patent Application Laid-Open No. 111829/1983 (JP-58-111829A), Japanese Patent Application Laid-Open No. 283179/1987 (JP-62-283179A), Kogyokagaku Zasshi (Journal of the Chemical Society of Japan, Industrial Chemistry) Vol. 74, No. 4, page 786 (1971), Kogyokagaku Zasshi (Journal of the Chemical Society of Japan, Industrial Chemistry) Vol. 74, No. 10, page 2185 (1971), Engineering Plastic Jiten (Engineering Plastic Dictionary) page 74 (Gihodo Shuppan Co., Ltd., 1998), and references described in these documents.

The number average molecular weight of the aromatic nylon is not particularly limited to a specific one, and for example may be selected from the range of about 300to $10\times10^4$, and preferably about 500 to $5\times10^4$.

(Polyarylate-series Resin)

As the polyarylate-series resin, there may be employed a compound having a structural unit represented by the following formula (5):

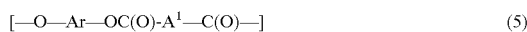

[—O—Ar—OC(O)-$A^1$—C(O)—]         (5)

wherein Ar stands for an aromatic group and $A^1$ stands for an aromatic, alicyclic, or aliphatic group.

Such a polyarylate-series resin may be produced by a fusion polymerization method, a solution polymerization method, or an interfacial polymerization method with utilizing, as a way of polyesterification, a transesterification method (e.g., acetate method, phenyl ester method), an acid chloride method, a direct method, or an addition polymerization method.

The polyarylate-series resin may be obtained through a reaction of an aromatic polyol component with a polycarboxylic acid component (e.g., an aromatic polycarboxylic acid component, an aliphatic polycarboxylic acid component, an alicyclic polycarboxylic acid component). The polycarboxylic acid component usually contains at least an aromatic polycarboxylic acid component.

Usually employed as the aromatic polyol (monomer) is a diol such as a monocyclic aromatic diol and a polycyclic aromatic diol, or a reactive derivative thereof [e.g., a salt (e.g., sodium salt, potassium salt) of an aromatic polyol, an ester of an aromatic polyol (e.g., an ester of acetic acid), a silyl-protected aromatic polyol (e.g., trimethylsilylated aromatic polyol)].

Exemplified as the monocyclic aromatic diol is an diol having an aromatic ring of about 6 to 20 carbon atoms, such as a benzenediol (e.g., resorcinol, hydroquinone, m-xylene glycol, p-xylylene glycol) and a naphthalenediol.

As the polycyclic aromatic diol, there may be mentioned, for example, a bisphenol as exemplified in the paragraph of the $Z^1$ mentioned above. The preferred aromatic polyol includes a bisphenol, for example, a bis(hydroxyaryl)$C_{1-6}$alkane (e.g., bisphenol A, bisphenol F, and bisphenol AD), and others. These aromatic polyols may be used singly or in combination.

Incidentally, the aromatic polyol may be used together with an aliphatic or alicyclic polyol. Examples of the aliphatic polyol are a $C_{1-10}$ aliphatic polyol such as ethylene glycol, propylene glycol, butanediol, pentanediol, hexanediol and neopentyl glycol. Moreover, examples of the aliphatic polyol also include an aliphatic polyol having a $C_{3-10}$ aliphatic ring, such as 1,4-cyclohexanedimethanol. As the alicyclic polyol, there may be mentioned, for example, a $C_{3-10}$ alicyclic polyol such as cyclohexanediol.

Exemplified as the aromatic polycarboxylic acid are a dicarboxylic acid such as a monocyclic aromatic dicarboxylic acid and a polycyclic aromatic dicarboxylic acid, or a reactive derivative thereof [for example, an aromatic polycarboxylic acid halide (e.g., an aromatic polycarboxylic acid chloride), an aromatic polycarboxylic ester (e.g., an alkyl ester, an aryl ester), and an aromatic polycarboxylic acid anhydride].

Examples of the monocyclic aromatic dicarboxylic acid are an aromatic carboxylic acid exemplified in the paragraph on the aromatic nylon (an aryldicarboxylic acid having 8 to 20 carbon atoms, e.g., a benzenedicarboxylic acid and a naphthalenedicarboxylic acid). Incidentally, the benzenedicarboxylic acid and naphthalenedicarboxylic acid (particularly, benzenedicarboxylic acid) may have one or two $C_{1-4}$alkyl group(s) as a substituent.

Examples of the polycyclic aromatic dicarboxylic acid are a bis(arylcarboxylic acid), for example, biphenyldicarboxylic acid, a bis(carboxyaryl)$C_{1-6}$alkane such as bis(carboxyphenyl)methane; a bis(carboxyaryl)$C_{3-12}$cycloalkane such as bis (carboxyphenyl)cyclohexane; a bis(carboxyaryl)ketone such as bis(carboxyphenyl)ketone; a bis(carboxyaryl)sulfoxide such as bis(carboxyphenyl)sulfoxide; a bis(carboxyaryl) ether such as bis(carboxyphenyl)ether; and a bis(carboxyaryl)thioether such as bis(carboxyphenyl)thioether.

The preferred aromatic polycarboxylic acid component includes a monocyclic aromatic dicarboxylic acid (particularly, a benzenedicarboxylic acid such as phthalic acid, isophthalic acid and terephthalic acid), a bis(carboxyaryl)$C_{1-6}$alkane, and others.

The aliphatic polycarboxylic acid (monomer) includes an aliphatic dicarboxylic acid exemplified in the paragraph on the aromatic nylon (in particular a $C_{2-20}$ aliphatic dicarboxylic acid), and may be a dicarboxylic acid having a $C_{3-10}$aliphatic ring, such as dicarboxymethylcyclohexane. The alicyclic polycarboxylic acid includes an alicyclic dicarboxylic acid exemplified in the paragraph on the aromatic nylon (in particular a $C_{3-20}$alicyclic dicarboxylic acid).

Preferred as the polyarylate-series resin are, for example, a polyarylate resin wherein the aromatic polyol is a bisphenol, such as a polyester of a bisphenol (e.g., bisphenol A, bisphenol AD, bisphenol F) with a benzenedicarboxylic acid (e.g., isophthalic acid, terephthalic acid), and a polyester of the bisphenol with a bis(arylcarboxylic acid) [e.g., a bis(carboxyaryl)$C_{1-4}$alkane such as bis(carboxyphenyl)methane, bis(carboxyphenyl)ethane and bis(carboxyphenyl)propane]. These polyarylate-series resins may be used singly or in combination.

Moreover, the polyarylate-series resin may be a resin using, if necessary an aromatic triol, an aromatic tetraol [e.g., 1,1,2,2-tetrakis(hydroxyphenyl)ethane], an aromatic tricarboxylic acid, or an aromatic tetracarboxylic acid, in addition to an aromatic diol and an aromatic dicarboxylic acid.

The terminal (or end) of the polyarylate-series resin may be blocked with (bonded to) an alcohol, or a carboxylic acid (particularly, a monohydric alcohol, a monofunctional carboxylic acid). Examples of the monohydric alcohol for blocking the terminal of the polyarylate-series resin are a monohydric aryl alcohol (e.g., a monohydric phenol which may be substituted with a $C_{1-10}$alkyl group and/or a $C_{6-10}$aryl group, for example, phenol, an alkylphenol having one or two $C_{1-4}$alkyl group(s) (such as methyl group) at o-, m- or p-position; an arylphenol having phenyl, benzyl or cumyl group at o-, m- or p-position), a monohydric alkyl alcohol (e.g., a $C_{1-20}$alkyl monoalcohol such as methanol, ethanol, propanol, butanol, hexanol and stearyl alcohol), a monohydric aralkyl alcohol (e.g., a $C_{7-20}$aralkyl monoalcohol such as benzyl alcohol and phenethyl alcohol), and others.

Examples of the monofunctional carboxylic acid for blocking the terminal of the polyarylate-series resin include a monofunctional aliphatic carboxylic acid (a $C_{1-20}$ aliphatic monocarboxylic acid such as acetic acid, propionic acid and octanoic acid), a monofunctional alicyclic carboxylic acid (e.g., a $C_{4-20}$ alicyclic monocarboxylic acid such as cyclohexanecarboxylic acid) and a monofunctional aromatic carboxylic acid (a $C_{7-20}$ aromatic monocarboxylic acid such as benzoic acid, toluic acid, o-, m-, or p-tert-butylbenzoic acid and p-methoxyphenylacetic acid). The carboxylic acid may be a monofunctional aliphatic carboxylic acid substituted with an aromatic group such as phenylacetic acid (particularly, a $C_{1-10}$ aliphatic monocarboxylic acid substituted with a $C_{6-20}$ aromatic group).

Moreover, the polyarylate-series resin may constitute a polymer alloy with a resin other than the polyarylate-series resin, such as a polymer alloy with a polyamide or the like. The polymer alloy includes not only a simple mixture but also a transesterified polymer alloy or a polymer alloy containing a compatibilizing agent.

The number average molecular weight of the polyarylate-series resin is, for example, about 300 to $30\times10^4$, preferably about 500 to $10\times10^4$, and more preferably about 500 to $5\times10^4$.

(Aromatic Epoxy Resin)

Examples of the aromatic epoxy resin include an ether-series epoxy resin (e.g., a bisphenol-based epoxy resin, a novolak epoxy resin) and an amine-series epoxy resin formed with an aromatic amine component.

Examples of the bisphenol constituting a bisphenol-based epoxy resin are the same as the bis(hydroxyaryl) listed above. The preferred bisphenol-based epoxy resin includes a glycidyl ether of a bis(hydroxyaryl)$C_{1-6}$alkane, particularly bisphenol A, bisphenol AD, bisphenol F or the like. Moreover, examples of the bisphenol-based epoxy resin also include the above-mentioned bisphenol glycidyl ether of high molecular weight (that is, a phenoxy resin).

Examples of the novolak resin constituting a novolak epoxy resin include a novolak resin in which an alkyl group (e.g., a $C_{1-20}$alkyl group, preferably a $C_{1-4}$ alkyl group such as methyl group and ethyl group) may be substituted on the aromatic ring (e.g., a phenol-novolak resin, a cresol-novolak resin). The preferred novolak epoxy resin includes a glycidyl ether of a novolak resin which may be substituted with a $C_{1-2}$alkyl group.

Examples of the aromatic amine component constituting an amine-series epoxy resin are a monocyclic aromatic amine (e.g., aniline, toluidine), a monocyclic aromatic diamine (e.g., diaminobenzene, xylylenediamine), a monocyclic aromatic aminoalcohol (e.g., aminohydroxybenzene), a polycyclic aromatic diamine (e.g., diaminodiphenylmethane), and a polycyclic aromatic amine.

The number average molecular weight of the aromatic epoxy resin is, for example, about 200 to 50,000, preferably about 300 to 10,000, and more preferably about 400 to 6,000 (e.g., about 400 to 5,000). Moreover, the number average molecular weight of the phenoxy resin is, for example, about 500 to 50,000, preferably 1,000 to 40,000, and more preferably about 3,000 to 35,000.

The aromatic epoxy resin may be used in a cured state, and the curing is effected by the use of a curing agent, e.g., an amine-series curing agent (e.g., an aliphatic amine such as ethylenediamine; an aromatic amine such as metaphenylenediamine and xylylenediamine), a polyaminoamide-series curing agent, an acid and acid anhydride-series curing agent.

These resin components may be used singly or in combination.

(Resin Containing Aromatic Ring Having Hydroxyl Group and/or Amino Group)

The resin containing an aromatic ring having a hydroxyl group and/or an amino group (an aromatic ring having at least one group selected from a hydroxyl group and an amino group) includes a resin of which the main chain or side chain contains the aromatic ring. Among these resins, as the resin of which the main chain contains the aromatic ring, for example, there may be mentioned a novolak resin and an aralkyl resin. As the resin of which the side chain contains the aromatic ring, there may be mentioned an aromatic vinyl resin.

(1) Novolak Resin

The novolak resin has a repeating unit represented by the following formula (6):

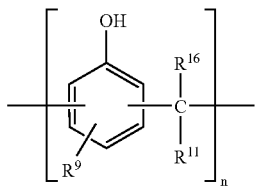

(6)

wherein $R^9$ to $R^{11}$ are the same or different, each representing a hydrogen atom, an alkyl group, or an aryl group, "n" denotes an integer of not less than 1.

The alkyl group and the aryl group includes a $C_{1-20}$alkyl group such as methyl, ethyl, butyl, t-butyl, hexyl, octyl, nonyl and dodecyl groups (particularly a $C_{1-12}$alkyl group), a $C_{6-20}$aryl group such as phenyl and naphthyl groups and a substituted aryl group (particularly a $C_{1-4}$alkyl-substituted aryl group such as methylphenyl group and ethylphenyl group).

The novolak resin (particularly a random novolak resin) is usually obtainable by a reaction of a phenol with an aldehyde. As the phenol, for example, there may be mentioned phenol, p- or m-cresol, 3,5-xylenol, an alkyl phenol (e.g., a $C_{1-20}$alkyl phenol such as t-butyl phenol, p-octyl phenol, and nonyl phenol), an aryl phenol (e.g., phenyl phenol, benzyl phenol, cumyl phenol), and others. These phenols may be used singly or in combination.

The aldehyde includes, for example, an aliphatic aldehyde such as formaldehyde, acetaldehyde and propionaldehyde, and an aromatic aldehyde such as phenylacetaldehyde. The preferred aldehyde includes formaldehyde. Moreover, a condensate of formaldehyde such as trioxane and paraformaldehyde may be also used. The ratio of the phenol relative to the aldehyde (the former/the latter) is about 1/0.5 to 1/1 (molar ratio).

The condensation reaction of the phenol with the aldehyde is usually carried out in the presence of an acid catalyst. As the acid catalyst, for example, there may be mentioned an inorganic catalyst (e.g., hydrochloric acid, sulfuric acid, phosphoric acid), and an organic catalyst (e.g., p-toluenesulfonic acid, oxalic acid).

In particular, a phenol novolak resin having decreased content of a monomer or dimer of a phenol is preferred. Such a phenol novolak resin is, for example, available as trade name "SUMILITE RESIN PR-53647", "SUMILITE RESIN PR-NMD-100 series", or "SUMILITE RESIN PR-NMD-200 series" from Sumitomo Durez Co., Ltd.

Moreover, as the novolak resin, a high-orthonovolak resin having an ortho/para ratio of not less than 1 may be used. Regarding the bonding of the methylene group in the novolak resin, the methylene group may connect (or link) two aromatic rings each having a hydroxy group on the position of (i) ortho-positions of the aromatic rings adjacent to the hydroxyl groups, (ii) ortho-position of one aromatic ring relative to the hydroxyl group and para-position of the other aromatic ring relative to the hydroxyl group, or (iii) para-positions of the aromatic rings relative to the hydroxyl groups.

Assuming that the bonding number of the methylene group on para-positions relative to the hydroxyl groups is $M_P$; the bonding number of the methylene group on ortho-position and para-position relative to the hydroxyl groups, respectively, is $M_{OP}$; and the bonding number of methylene group on ortho-positions relative to the hydroxyl groups is $M_O$, the ortho/para ratio is represented by the following formula.

ortho/para ratio=$[M_O+(1/2)M_{OP}]/[M_P+(1/2)M_{OP}]$

For example, the ortho/para ratio can be determined using the above formula based on the bonding number of methylene group measured by $^{13}$C-NMR spectrum measurement.

In particular, as the novolak resin, it is preferred to use a novolak resin having an ortho/para ratio of not less than 1, for example, about 1 to 20 (particularly about 1 to 15), so-called a high-orthonovolak resin. Such a high-orthonovolak resin is procurable from Sumitomo Durez Co., Ltd. as "SUMILITE RESIN HPN SERIES".

A novolak resin having an ortho/para ratio of not less than 1 can be synthesized by, e.g., (1) a process in which, in the presence of at least one catalyst selected from a metal salt, a metal oxide, a metal hydroxide, and an amine compound, or after another addition-condensation reaction has been carried out, an acid catalyst is added to react a phenol with an aldehyde [e.g., Japanese Patent Application Laid-Open No. 90523/1980 (JP-55-90523A), Japanese Patent Application Laid-Open No. 51714/1982 (JP-57-51714A), Japanese Patent Application Laid-Open No. 80418/1984 (JP-59-80418A), Japanese Patent Application Laid-Open No. 230815/1987 (JP-62-230815A), and U.S. Pat. No. 4,113,700], (2) a process in which a phenol is reacted with an aldehyde in a non-polar solvent (e.g., an aromatic hydrocarbon such as xylene, toluene and benzene, an alicyclic hydrocarbon such as cyclohexane) under applied pressure [e.g., Japanese Patent Application Laid-Open No. 345837/1994 (JP-6-345837A), and Macromol. Chem. 182, 2973 (1981)], (3) a process in which, without using a catalyst, a phenol is reacted with an aldehyde according to a strictly regulated procedure and under strictly controlled conditions [e.g., Japanese Patent Application Laid-Open No. 195158/1998 (JP-10-195158A), and Japanese Patent Application Laid-Open No. 204139/1998 (JP-10-204139A)], or (4) a process in which a metal phenolate such as magnesium bromide or magnesium methylate of a phenol is reacted with an aldehyde in the above non-polar solvent [e.g., U.S. Pat. No. 4,097,463, and Macromolecules, 17, 19 (1984)]. The ratio of the phenol relative to the aldehyde (the former/the latter) is about 1/0.3 to 1/1 (molar ratio).

Exemplified as the metal salt catalyst is a polyvalent metal salt (e.g., salts with Zn, Mg, Mn, Cd, Ca, Co, Pb, Cu, Ni, and Al) of organic acid (e.g., an aliphatic carboxylic acid such as acetic acid, naphthenic acid and oxalic acid; a sulfonic acid such as methanesulfonic acid). Examples of the metal oxide and metal hydroxide are a polyvalent metal oxide and polyvalent metal hydroxide (e.g., an oxide and hydroxide of Zn, Mg, Mn, Cd, Ca, Co, Pb, Cu, Ni, and Al). Exemplified as the amine compound is an aliphatic amine (e.g., dimethylamine, and diethylamine). These catalysts can be used either singly or in combination.

Although the high-orthonovolak resin can be used even if the catalyst, such as a metal salt, a metal oxide, or a metal hydroxide, remains therein, it would be desirable that the amount of the residual catalyst is reduced by washing with water or other means. Moreover, a high-orthonovolak resin obtainable by the process (3) is preferable, for the process (3) does not involve the use of a catalyst and thus it is not necessary to remove a catalyst from the resulting resin.

Incidentally, there may be also used a co-condensate of the above-mentioned phenol with a co-condensable component such as a dioxybenzene, a naphthol, a bisphenol (e.g., the bisphenol exemplified in the item on the $Z^1$), an alkylbenzene (e.g., toluene, ethylbenzene, xylene, mesitylene), an aniline, a furfural, a urea or a triazine (e.g., urea, cyanuric acid, isocyanuric acid, melamine, guanamine, acetoguanamine, benzoguanamine), a terpene, a cashew nut, and a rosin. In particular, an aminotriazine novolak resin modified with a triazine is a preferred co-condensate. Such an aminotriazine novolak may be obtained by condensation of a phenol, a triazine and a formaldehyde in the presence or absence of an basic catalyst (e.g., ammonia, triethylamine, triethanolamine) and/or an acid catalyst (e.g., oxalic acid) [for example, DIC Technical Review No. 3, p 47 (1997), Japanese Patent Application Laid-Open No. 253557/1996 (JP-8-253557A), and Japanese Patent Application Laid-Open No. 279657/1998 (JP-10-279657A)]. An aminotriazine novolak is available from Dainippon Ink And Chemicals, Inc. as trade name "PHENOLITE".

Moreover, a modified novolak resin (e.g., a phosphoric acid-modified novolak resin or a boric acid-modified novolak resin) may be also employed, and the modified novolak resin is a novolak resin (random novolak resin, high-ortho novolak resin) in which phenolic hydroxyl groups are partially or wholly modified with at least one compound selected from phosphorus-containing compounds (e.g., a phosphoric acid such as phosphoric acid, phosphorous acid, an organic phosphorous acid and an organic hypophosphorous acid, and an acid anhydride, a halide, a salt or an ester (in particular, an aliphatic ester) thereof) and boron-containing compounds (e.g., a boric acid such as boric acid, an organic boronic acid and an organic borinic acid, and an acid anhydride, a halide, a salt or an ester thereof). The hydroxyl group in the novolak resin is usually modified to a phosphoric ester or a boric ester.

Further, a modified novolak resin in which a hydrogen atom of a phenolic hydroxyl group in a novolak resin (random novolak resin and high-ortho novolak resin) is partially or wholly modified (or substituted) with a metal ion, a silyl group, or an organic group (e.g., an alkyl group, an alkanoyl group, and a benzoyl group) is also available.

Preferred as the novolak resins are, for example, phenol-formaldehyde novolak resin, an alkylphenol-formaldehyde resin (e.g., a t-butylphenol-formaldehyde novolak resin, a p-octylphenol-formaldehyde resin), a co-condensate thereof (an aminotriazine-novolak resin), and a mixture thereof.

There is no particular restriction as to the number average molecular weight of the novolak resin (random novolak resin and high-ortho novolak resin), and it may be selected within the range of 300 to $5 \times 10^4$, preferably 300 to $1 \times 10^4$, and more preferably 300 to 8,000 (e.g., particularly, 300 to 5,000).

(2) Aralkyl Resin

The aralkyl resin has a structural unit represented by the following formula (7):

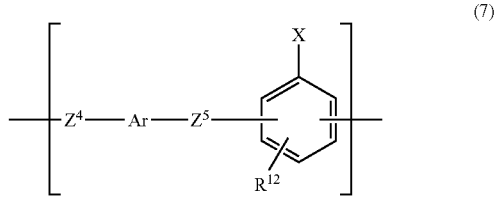

(7)

wherein Ar represents an aromatic group, $Z^4$ and $Z^5$ are the same or different, each representing an alkylene group, $R^{12}$ represents a hydrogen atom or an alkyl group, and X represents a hydroxyl group, an amino group, or an N-substituted amino group.

The aromatic group represented by Ar includes an aromatic group having 6 to 20 carbon atoms, for example, a phenylene group (e.g., o-phenylene group, m-phenylene group, p-phenylene group), and naphthylene group, preferably a phenylene group (in particular p-phenylene group).

The alkylene group represented by $Z^4$ and $Z^5$ includes a $C_{1-6}$ alkylene group such as methylene, ethylene, propylene, tetramethylene and hexamethylene (a $C_{1-4}$alkylene group, particularly a $C_{1-2}$alkylene group). The alkyl group represented by $R^{12}$ includes a $C_{1-20}$alkyl group exemplified in the item on the $R^9$ to $R^{10}$ (in particular a $C_{1-4}$alkyl group).

The N-substituted amino group represented by X includes a mono- or di$C_{1-4}$alkylamino group, for example, dimethylamino group and diethylamino group.

In many cases, a phenol aralkyl resin having a hydroxyl group as X is used as an aralkyl resin. The preferred phenol aralkyl resin includes a resin having methylene groups as $Z^4$ and $Z^5$, a phenylene group as Ar, a hydrogen atom as $R^{12}$, and a p-xylene-substituted phenol represented by the following formula (8) as a repeating unit.

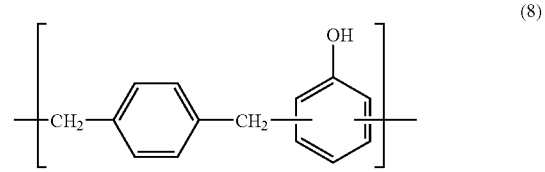

(8)

The aralkyl resin may be usually obtained by reacting a compound represented by the formula (9) with a phenol or an aniline. A phenolalkyl resin is formed through the use of a phenol, and an anilinearalkyl resin is formed through the use of an aniline.

Y-$Z^4$-Ar-$Z^5$-Y                        (9)

In the formula, Y represents an alkoxy group, an acyloxy group, a hydroxyl group, or a halogen atom, and Ar, $Z^4$ and $Z^5$ have the same meanings as defined above.

In the formula (9), an alkoxy group represented by Y includes a $C_{1-4}$ alkoxy group such as methoxy, ethoxy, propoxy and butoxy group. Examples of the acyloxy group include an acyloxy group having about 2 to 5 carbon atoms, such as acetoxy group. Moreover, examples of the halogen atom include chlorine, bromine, and iodine.

The compound represented by the formula (9), for example, includes an aralkyl ether such as a xylylene glycol $C_{1-4}$alkyl ether (e.g., p-xylylene glycol dimethyl ether, p-xylylene glycol diethyl ether), an acyloxyaralkyl such as p-xylylene-α,α'-diacetate, an aralkyldiol such as p-xylylene-α,α'-diol, an aralkyl halide such as p-xylylene-α,α'-dichloride and p-xylylene-α,α'-dibromide.

The phenol includes a phenol or alkylphenol exemplified in the section on the novolak resin. These phenols may be used either singly or in combination.

Examples of the aniline are aniline, an alkylaniline (e.g., a $C_{1-20}$alkylaniline such as toluidine, xylidine, octylaniline and nonylaniline), and an N-alkylaniline (e.g., an N—$C_{1-4}$alkylaniline such as N,N-dimethylaniline and N,N-diethylaniline). These anilines may be used either singly or in combination.

The ratio of the compound represented by the formula (9) relative to the phenol or aniline (the former/the latter) is, for example, about 1/1 to 1/3 (molar ratio), and preferably about 1/1 to 1/2.5 (molar ratio).

The reaction of the compound represented by the formula (9) with the phenol or the aniline may be carried out in the presence or absence of a catalyst. For example, in the case where an aralkyl ether is employed as the compound of the formula (9), the reaction may be effected in the presence of a catalyst. In the case of the use of an aralkyl halide, the reaction may be effected in the absence of a catalyst. Examples of the catalyst are a Friedel-Crafts catalyst such as dimethyl sulfate, diethyl sulfate, tin chloride and aluminum chloride.

Moreover, the reaction may be effected in the presence or absence of a solvent. The reaction temperature is for example about 50 to 250° C., and preferably about 100 to 230° C. When an aralkyl halide is employed as a reactant, the reaction temperature may be lower than the one mentioned above. For example, the reaction temperature may be about 50 to 150° C., and particularly about 70 to 130° C.

In the reaction described above, together with the phenol and/or aniline, there may be additionally used a co-condensable component in combination, such as an aldehyde (e.g., the aldehyde exemplified in the section on the novolak resin, and benzaldehyde), an hydroxybenzoic acid (e.g., p-hydroxybenzoic acid; an alkyl ester of p-hydroxybenzoic acid such as methyl p-hydroxybenzoate and ethyl p-hydroxybenzoate), an hydroxybenzene (e.g., dihydroxybenzene, trihydroxybenzene), a naphthol (e.g., 1-naphthol, 2-naphthol, 1,6-dihydroxynaphthalene, 2,7-dihydroxynaphthalene, hydroxynaphthoic acid, an alkyl ester of hydroxynaphthoic acid), a bisphenol (e.g., the bisphenol exemplified in the section on the $Z^1$), an aniline, a furfural, and an alkylbenzene and a urea exemplified as a copolymerizable component in the section on the novolak resin.

Further, as the aralkyl resin, there may be used a modified aralkyl resin, in which at least part of the hydroxyl group or amino group denoted by X has been modified with at least one member selected from phosphorus-containing compounds and boron-containing compounds exemplified in the section on the novolak resin, for example a phosphoric acid-modified phenolaralkyl resin, a phosphoric acid-modified anilinearalkyl resin, a boric acid-modified phenolaralkyl resin and a boric acid-modified anilinearalkyl resin. The hydroxyl group of the aralkyl resin has been usually modified into a phosphate or borate, and the amino group into a phosphoric acid amide or a boric acid amide.

The softening point of the aralkyl resin thus obtained is, for example, about 40 to 160° C., preferably about 50 to 150° C., and more preferably about 55 to 140° C. Incidentally, as other aralkyl resin, there may be used an aralkyl resin described in Japanese Patent Application Laid-Open No. 351822/2000 (JP-2000-351822A).

If necessary, the aralkyl resin may be cured or modified. Curing or modification may be usually effected by a conventional method, such as methylene-crosslinking with the use of a polyamine (e.g., hexamethylenetetramine) and epoxy-modification with the use of an epoxy compound (e.g., epichlorohydrin).

Furthermore, if necessary, the aralkyl resin may be modified with an elastomer. Modification with an elastomer may be chemically effected using a synthetic rubber, a polyolefin (e.g., a polyisobutylene, a polyethylene), or other elastomers.

(3) Aromatic Vinyl Resin

The aromatic vinyl resin includes, for example, a resin having a structural unit represented by the following formula (10):

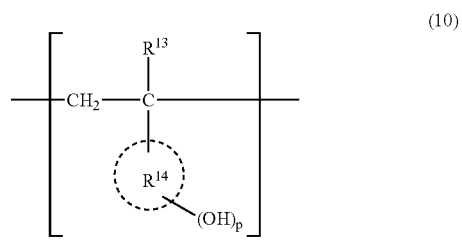

(10)

wherein $R^{13}$ represents a hydrogen atom or a $C_{1-3}$ alkyl group, $R^{14}$ represents an aromatic ring, and "p" denotes an integer of 1 to 3.

In the formula (10), the preferred $C_{1-3}$ alkyl group includes methyl group. As the aromatic ring, there may be mentioned a $C_{6-20}$ aromatic ring such as benzene ring and naphthalene ring. Incidentally, the aromatic ring may have a substituent (e.g., a hydroxyl group; the alkyl group exemplified in the item on the above-mentioned $R^9$ to $R^{10}$; the alkoxy group exemplified in the item on the above-mentioned Y).

In the formula (10), the hydrogen atom of the hydroxyl group may be protected by a metal ion, a silyl group, or an organic group (or protecting group) such as an alkyl group, an alkanoyl group and a benzoyl group.

A resin obtained from such a derivative has, for example, a structural unit represented by the following formula (11):

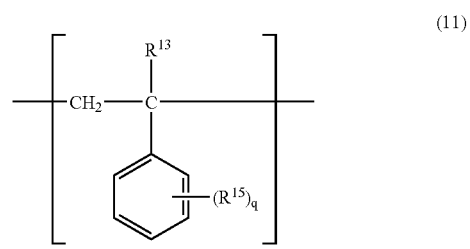

(11)

wherein $R^{13}$ has the same meaning as defined above, $R^{15}$ is a group selected from the group consisting of —OH, —OSi $(R^{16})_3$ and —OM ("M" represents a metal cation, $OR^{16}$ and $OCOR^{16}$, and $R^{16}$ represents an alkyl group having 1 to 5 carbon atom(s) or aryl group), and "q" denotes an integer of 1 to 3.

In the formula, "M" may be either a monovalent alkali metal cation (e.g., sodium, lithium, potassium), a bivalent alkaline earth metal cation (e.g., magnesium, calcium), or a transition metal cation.

It is sufficient that the substituent $R^{15}$ in the formula is positioned in any one of ortho-position, meta-position and para-position. Further, in addition to the substituent $R^{15}$, a pendant aromatic ring may have a $C_{1-4}$ alkyl group as a substituent.

The aromatic vinyl-series resin includes a homo- or copolymer of an aromatic vinyl monomer having a hydroxyl group, corresponding to the above-mentioned structural unit (10), or a copolymer with other copolymerizable monomer.

As the aromatic vinyl monomer, for example, there may be mentioned a hydroxyl group-containing aromatic vinyl monomer such as vinylphenol, dihydroxystyrene and vinylnaphthol. These aromatic vinyl monomers may be used singly or in combination.

Examples of the other copolymerizable monomer are a (meth)acrylic monomer [e.g., (meth)acrylic acid, a (meth) acrylate (e.g., a $C_{1-18}$alkyl(meth)acrylate such as methyl (meth)acrylate, ethyl(meth)acrylate, butyl(meth)acrylate and 2-ethylhexyl(meth)acrylate, a hydroxyl group-containing monomer such as 2-hydroxyethyl(meth)acrylate, glycidyl (meth)acrylate), (meth)acrylamide, (meth)acrylonitrile], a styrenic monomer (e.g., styrene, vinyltoluene, α-methylstyrene, chlorostyrene, vinylnaphthalene, vinylcyclohexane), a polymerizable polycarboxylic acid (e.g., fumaric acid, maleic acid),a maleimide-series monomer (e.g., maleimide, an N-alkylmaleimide, an N-phenylmaleimide), a diene-series monomer (e.g., isoprene, 1,3-butadiene, 1,4-hexadiene, dicyclopentadiene), and a vinyl-series monomer (e.g., a vinyl ester such as vinyl acetate and vinyl propionate; a vinyl ketone such as methyl vinyl ketone and methyl isopropenyl ketone; a vinyl ether such as vinyl isobutyl ether and vinyl methyl ether; a nitrogen-containing vinyl monomer such as N-vinylcarbazole, and N-vinylpyrrolidone, N-vinylimidazole). These copolymerizable monomers may be used either singly or in combination.

The ratio of the vinyl monomer relative to the copolymerizable monomer is, for example, about 10/90 to 100/0 (% by weight), preferably about 30/70 to 100/0 (% by weight), and more preferably about 50/50 to 100/0 (% by weight).

The preferred aromatic vinyl resin includes a vinylphenol homopolymer (a polyhydroxystyrene), particularly a p-vinylphenol homopolymer.

There is no particular restriction as to the number average molecular weight of the aromatic vinyl-series resin, and it may be selected within the range of, for example, 300 to $50 \times 10^4$, preferably 400 to $30 \times 10^4$, and more preferably about 500 to $5 \times 10^4$.

Among the aromatic resins (E1), the polycarbonate-series resin, the polyarylate-series resin, the aromatic epoxy resin, and the resin of which the main chain or side chain contains an aromatic ring having a hydroxyl group, in particular, the polycarbonate-series resin, the aromatic epoxy resin, the novolak-phenol resin, and the polyarylate-series resin, are preferred.

(E2) Inorganic Flame-retardant Auxiliary (Inorganic Flame Retardant) (E2)

The inorganic flame-retardant auxiliary (E2) includes a metal borate (E2a), a metal hydrogenphosphate (E2b), a red phosphorus (E2c), a metal oxide (E2d), a metal hydroxide (E2e), a metal sulfide (E2f), and an expansive graphite (E2 g). These inorganic flame-retardant auxiliaries (E2) may be used singly or in combination.

(Metal Borate (E2a))

The boric acid preferably includes a non-condensed boric acid such as orthoboric acid and metaboric acid; a condensed boric acid such as pyroboric acid, tetraboric acid, pentaboric acid and octaboric acid; and a basic boric acid.

A metal forming a salt with the boric acid includes an alkali metal (e.g., potassium, sodium); an alkaline earth metal (e.g., magnesium, calcium, barium); a transition metal [e.g., the metal of the Group 3A of the Periodic Table of Elements (such as scandium); the metal of the Group 4A of the Periodic Table of Elements (such as titanium); the metal of the Group 5A of the Periodic Table of Elements (such as vanadium); the metal of the Group 6A of the Periodic Table of Elements (such as chromium and molybdenum); the metal of the Group 7A of the Periodic Table of Elements (such as manganese); the metal of the Group 8 of the Periodic Table of Elements (such as iron, cobalt, nickel and palladium); and the metal of the Group 1B of the Periodic Table of Elements (such as copper and silver)], the metal of the Group 2B of the Periodic Table of Elements (such as zinc, cadmium and mercury), the metal of the Group 3B of the Periodic Table of Elements (such as aluminum), the metal of the Group 4B of the Periodic Table of Elements (such as tin and lead), and the metal of the Group 5B of the Periodic Table of Elements (such as antimony and bismuth). These metals may be used singly or in combination. As the metal, the alkali metal may be used, and it is preferred to use a polyvalent metal such as the alkaline earth metal, the transition metal and the metal of the Group 2B of the Periodic Table of Elements.

The metal borate is usually a salt hydrate and includes, for example, a non-condensed borate [e.g., a non-condensed borate of an alkaline earth metal (such as calcium orthoborate and calcium metaborate); a non-condensed borate of a transition metal (such as manganese orthoborate and copper metaborate); a non-condensed borate of the metal of the Group 2B of the Periodic Table of Elements (such as zinc metaborate and cadmium metaborate), in particular metaborate], a condensed borate [e.g., a condensed borate of an alkaline earth metal (such as trimagunesium tetraborate and calcium pyroborate); a condensed salt of a transition metal (such as manganese tetraborate and nickel diborate); a condensed borate of the metal of the Group 2B of the Periodic Table of Elements (such as zinc tetraborate and cadmium tetraborate)], and a basic borate (e.g., a basic borate of the metal of the Group 2B of the Periodic Table of Elements, such as basic zinc borate and basic cadmium borate). Moreover, a hydrogenborate corresponding to the borate (e.g., manganese hydrogenorthoborate) may be also employed. In particular, a borate of the alkaline earth metal or metal of the Group 2B of the Periodic Table of Elements (a non-condensed or condensed borate) (particularly a (hydrous)zinc borate, a (hydrous)calcium borate) is preferred.

(Metal Hydrogenphosphate (E2b))

Preferred as a phosphoric acid is a non-condensed phosphoric acid such as orthophosphoric acid, metaphosphoric acid, phosphorous acid, and hypophosphorous acid; and a condensed phosphoric acid such as hypophosphoric acid salt, pyrophosphoric acid salt, a polyphosphoric acid salt (e.g., triphosphoric acid salt, tetraphosphoric acid salt), a polymetaphosphoric acid salt [e.g., $(Ca)_3 (P_3O_9)_2$], and an anhydrous phosphoric acid salt [e.g., $Ca_2(P_4O^{12})$, $Ca_5(P_3O_{10})_2$], in particular a non-condensed phosphoric acid.

As the metal forming the hydrogenphosphate, there may be exemplified the same metal as the metal forming a salt with the boric acid. The metal preferably includes a polyvalent metal, for example, the alkaline earth metal, the transition metal and the metals of the Groups 2B and 3B of the Periodic Table of Elements, particularly the alkaline earth metal.

As the metal hydrogenphosphate, there may be mentioned a hydrogenphosphate of the phosphoric acid with the polyvalent metal. The metal salt may have a ligand (e.g., hydroxo, halogen).

The metal hydrogenphosphate includes, for example, a non-condensed hydrogenphosphate such as an alkaline earth metal hydrogenphosphate [e.g., a magnesium hydrogen orthophosphate (such as magnesium hydrogenphosphate and magnesium dihydrogenphosphate), a calcium hydrogen orthophosphate (such as calcium dihydrogenphosphate and calcium secondary phosphate)]; a transition metal hydrogenphosphate [e.g., manganese hydrogenphosphate (such as manganese(III) hydrogenphosphate), iron hydrogenphosphate (such as Fe(H$_2$PO$_4$)$_3$)]; a hydrogenphosphate of the metal of the Group 2B of the Periodic Table of Elements (such as zinc hydrogenphosphate and cadmium hydrogenphosphate); a hydrogenphosphate of the metal of the Group 3B of the Periodic Table of Elements (such as aluminum hydrogenphosphate); and a hydrogenphosphate of the metal of the Group 4B of the Periodic Table of Elements (such as tin hydrogenphosphate). Among them, a substantially anhydrous metal hydrogenphosphate, particularly an alkaline earth metal hydrogenphosphate [such as magnesium dihydrogenphosphate, calcium dihydrogenphosphate and calcium secondary phosphate (CaHPO$_4$)], is preferred.

(Red Phosphorus (E2c))

The red phosphorus has high flame-retarding effect, and can impart flame retardancy to a resin at a small amount of addition. Moreover, since the red phosphorus exerts such an effect at a small amount of addition, the red phosphorus imparts flame retardancy to a resin without deteriorating resin properties (e.g., mechanical and electrical properties). As the red phosphorus, usually, a red phosphorus which has undergone stabilization treatment, that is, a stabilized red phosphorus, is preferably employed. Particularly preferred are a red phosphorus which is obtained by finely dividing without pulverization and formation of the pulverized surface highly reactive to water or oxygen, and a red phosphorus the surface of which is coated with one member or a combination of two or more members selected from resins (e.g., thermosetting resins, thermoplastic resins), metals, metal compounds (e.g., metal hydroxides, metal oxides).

Exemplified as the thermosetting resin for coating the surface of the red phosphorus are a phenolic resin, amelamine-series resin, aurea-based resin, an alkyd resin, an unsaturated polyester-series resin, an epoxy resin, and a silicone-series resin, and examples of the thermoplastic resin are a polyester-series resin, a polyamide-series resin, an acrylic resin, an olefinic resin, and others. Examples of the metal hydroxide are aluminum hydroxide, magnesium hydroxide, calcium hydroxide, zinc hydroxide, and titanium hydroxide. Examples of the metal oxide are aluminum oxide, magnesium oxide, zinc oxide, titanium oxide, zirconium oxide, copper oxide, iron oxide, molybdenum oxide, tungsten oxide, manganese oxide, and tin oxide.

Further, a process for coating with a metal the surface of the red phosphorus for stabilization includes, for example, a coating process with a metal (e.g., iron, nickel, copper, aluminum, zinc, manganese, tin, titanium, zirconium) or an alloy thereof through electroless plating. Other processes for coating the surface of a red phosphorus include a process in which red phosphorus is treated with a solution of a metal salt (e.g., a salt with aluminum, magnesium, zinc, titanium, copper, silver, iron, nickel) to form a metal phosphorus compound on the red phosphorus surface for stabilization of the red phosphorus.

In particular, with the use of a process comprising pulverizing the red phosphorus without forming a crushed surface thereon, the red phosphorus may be subjected to coating treatment with a plurality of layers being a combination of a layer(s) of a metal component(s) (e.g., metal hydroxide, metal oxide) and a resin layer(s), particularly with a metal component layer covered by a plurality of resin layers. Such stabilized red phosphorus is excellent in heat stability and hydrolysis resistance and the amount of a phosphine produced upon decomposition in the presence of moisture or under high temperatures is so extremely small that they are preferable from the viewpoint of safety in the course of producing the resin composition of the present invention and a shaped article molded therefrom.

Such stabilized red phosphorus can be prepared referring to Japanese Patent Application Laid-Open No. 229806/1993 (JP-5-229806A), Japanese Patent Application Laid-Open No. 259956/1991 (JP-3-259956A), Japanese Patent Application Laid-Open No. 209991/1990 (JP-2-209991A), Japanese Patent Application Laid-Open No. 150309/1989 (JP-1-150309A), Japanese Patent Application Laid-Open No. 21704/1987 (JP-62-21704A), Japanese Patent Application Laid-Open No. 125489/1977 (JP-52-125489A), EP 296501A1, and EP249723A2.

As the red phosphorus, a stabilized one in the form of particles may be usually employed. The mean particle size of the stabilized red phosphorus is, for example, about 0.01 to 100 μm, preferably about 0.1 to 70 μm, and more preferably about 0.1 to 50 μm.

(Metal Oxide (E2d), Metal Hydroxide (E2e), Metal Sulfide (E2f))

The metal oxide includes, for example, molybdenum oxide, tungstic oxide, titanium oxide, zirconium oxide, tin oxide, copper oxide, zinc oxide, aluminum oxide, nickel oxide, iron oxide, manganese oxide, antimony trioxide, antimony tetraoxide, antimony pentaoxide, and others. The metal hydroxide includes, for example, aluminum hydroxide, magnesium hydroxide, tin hydroxide, and zirconium hydroxide. As the metal sulfide, for example, there may be mentioned zinc sulfide, molybdenum sulfide, tungstic sulfide, and others.

Moreover, the inorganic flame retardant also includes an expansive graphite (E2 g).

These flame-retardant auxiliaries (E) may be used singly or in combination. The proportion of the flame-retardant auxiliary (E) may for example be selected within the range of about 0.01 to 50 parts by weight, preferably about 0.05 to 30 parts by weight, and particularly about 0.1 to 20 parts by weight, relative to 100 parts by weight of the base resin.

[Additive]

If necessary, the flame-retardant resin composition of the present invention may comprise a variety of additives (for example, other flame-retardant, an antioxidant, a dripping inhibitor, a metal salt of an inorganic acid, and a stabilizer). The total content of the additive(s) is about 0.01 to 50 parts by weight, preferably about 0.1 to 30 parts by weight, and more preferably about 1 to 20 parts by weight, relative to 100 parts by weight of the base resin.

(Other Flame Retardant)

Incidentally, the flame-retardant resin composition of the present invention may comprise, in order to further impart flame retardancy to the composition, other flame retardant(s), for example, a phosphorus-containing compound, a sulfur-containing flame retardant, a silicon-containing flame retardant, an alcohol-based flame retardant, and others.

(1) Phosphorus-Containing Compound

As the phosphorus-containing compound, there may be mentioned a phosphorus-containing compound other than the phosphoric ester (B2) and the red phosphorus (E2) mentioned above, for example, an organic phosphorus compound (e.g., a monomeric organic phosphorus compound, a polymeric organic phosphorus compound), an inorganic phosphorus compound, and others.

The organic phosphorus compound includes an organic hypophosphorous acid (or phosphinic acid) compound [for example, a metal salt (e.g., a Ca, Mg, Zn, Ba, or Al salt) of an organic hypophosphorous acid (e.g., ethylmethylhypophosphorous acid, diethylhypophosphorous acid, ethylbutylhypophosphorous acid, dibutylhypophosphorous acid, ethanebis (methylhypophosphorous acid), 1-hydroxydihydrophospholeoxide, and 1-hydroxypholanoxide)], a phosphine oxide (e.g., triphenylphosphine oxide and tricresylphosphine oxide), and others.

The polymeric organic phosphorus compound also includes a condensate of the monomeric organic phosphorus compound, e.g., a polyphosphinicocarboxylic ester and a polyphosphorous acid amide.

Examples of the inorganic phosphorus compound include an inorganic phosphorus compound other than the redphosphorus (E2), e.g., a (poly)phosphate [a salt (e.g., an ammonium, Ca, Mg, Zn, Ba or Al salt) of a non-condensed or condensed phosphoric acid (such as a phosphoric acid, a phosphorous acid, a hypophosphorous acid and a polyphosphoric acid)].

(2) Sulfur-Containing Flame Retardant

The sulfur-containing flame retardant includes an organic sulfonic acid (e.g., an alkanesulfonic acid, a perfluoroalkanesulfonic acid, an arylsulfonic acid, a sulfonated polystyrene), sulfamic acid, an organic sulfamic acid, a salt of an organic sulfonic acid amide (e.g., an ammonium salt, an alkali metal salt, an alkaline earth metal salt), and others.

(3) Silicon-Containing Flame Retardant

The silicon-containing flame retardant includes a (poly) organosiloxane. As the (poly)organosiloxane, there may be mentioned a homopolymer such as a dialkylsiloxane (e.g., dimethylsiloxane), an alkylarylsiloxane (e.g., phenylmethylsiloxane), a diarylsiloxane, and a monoorganosiloxane (for instance, a polydimethylsiloxane, a polyphenylmethylsiloxane); a copolymer thereof; or others. Moreover, the (poly) organosiloxane also includes a branched organosiloxane [e.g., trade name "XC99-B5664" manufactured by Toshiba Silicone Co., Ltd., trade name "X-40-9243", "X-40-9244" and "X-40-9805" manufactured by Shin-Etsu Chemical Co., Ltd., and compounds described in Japanese Patent Application Laid-Open No. 139964/1998 (JP-10-139964A)], and a modified (poly)organosiloxane (for example, a modified silicone) having substituent(s) (such as an epoxy group, a hydroxyl group, a carboxyl group, an amino group, and an ether group) in the end or main chain of the molecule.

(4) Alcohol-Based Flame Retardant

Examples of the alcohol-based flame retardant include a polyhydric alcohol (e.g., pentaerythritol), an oligomeric polyhydric alcohol (e.g., dipentaerythritol, tripentaerythritol), an esterified polyhydric alcohol, a substituted alcohol, a cellulose compound (e.g., cellulose, hemicellulose, lignocellulose, pectocellulolse, adipocellulose), and a saccharide compound (e.g., a monosaccharide, a polysaccharide).

These other flame retardants may be used singly or in combination.

The content of other flame retardant may for example be selected within the range of about 0.01 to 50 parts by weight, preferably about 0.05 to 30 parts by weight, and particularly about 0.1 to 20 parts by weight, relative to 100 parts by weight of the base resin.

(Antioxidant or Stabilizer)

Moreover, the flame retardant resin composition of the present invention may comprise an antioxidant or a stabilizer to maintain thermal stability of the composition for a long term. The antioxidant or the stabilizer includes a phenol-series (e.g., hindered phenols), amine-series (e.g., hindered amines), phosphorous-series, sulfur-series, hydroquinone-series, or quinoline-series antioxidant (or stabilizer), an inorganic stabilizer, a compound having a functional group relative to an active hydrogen atom (reactive stabilizer), and others.

The phenol-series (phenolic) antioxidant preferably includes a hindered phenol (hindered phenol-series antioxidant), e.g., a $C_{2-10}$alkylene glycol-bis[3-(3,5-di-branched $C_{3-6}$alkyl-4-hydroxyphenyl)propionate] such as 1,6-hexanediol-bis[3-(3,5-di-t-butyl-4-hydroxyphenyl)propionate]; e.g., a di- or trioxy$C_{2-4}$alkylene glycol-bis[3-(3,5-di-branched $C_{3-6}$ alkyl-4-hydroxyphenyl)propionate] such as triethylene glycol-bis[3-(3-t-butyl-5-methyl-4-hydroxyphenyl)propionate]; e.g., a $C_{3-8}$alkylenetriol-bis[3-(3,5-di-branched $C_{3-6}$alkyl-4-hydroxyphenyl)propionate] such as glycerin-tris[3-(3,5-di-t-butyl-4-hydroxyphenyl)propionate]; and e.g., a $C_{4-8}$alkylene tetraol-tetrakis[3-(3,5-di-branched $C_{3-6}$alkyl-4-hydroxyphenyl)propionate] such as pentaerythritol-tetrakis[3-(3,5-di-t-butyl-4-hydroxyphenyl) propionate].

The amine-series antioxidant includes a hindered amine, for example, a tri- or tetra$C_{1-3}$alkylpiperidine or a derivative thereof [e.g., 2,2,6,6-tetramethylpiperidine which may have a substituent (such as methoxy, benzoyloxy or phenoxy group) at 4-position], a bis (tri-, tetra- or penta$C_{1-3}$alkylpiperidine) $C_{2-20}$alkylenedicarboxylic ester [e.g., bis(2,2,6,6-tetramethyl-4-piperidyl)oxalate, a melonate, adipate, sebacate or terephthalate corresponding to the oxalate; and bis(1,2,2,6,6-pentamethyl-4-piperidyl)sebacate], 1,2-bis(2,2,6,6-tetramethyl-4-piperidyloxy)ethane, phenylnaphthylamine, N,N'-diphenyl-1,4-phenylenediamine, and N-phenyl-N'-cyclohexyl-1,4-phenylenediamine.

The phosphorus-containing stabilizer (or antioxidant) includes an organic phosphorus-containing stabilizer, for example, triisodecyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, a tris(branched $C_{3-6}$alkylphenyl)phosphite [e.g., tris(2, 4-di-t-butylphenyl)phosphite, tris(2-t-butyl-4-methylphenyl) phosphite, tris(2,4-di-t-amylphenyl)phosphite], a (branched $C_{3-6}$alkylphenyl)phenyl phosphite [e.g., bis(2-t-butylphenyl) phenyl phosphite, 2-t-butylphenyldiphenylphosphite], tris(2-cyclohexylphenyl)phosphate, a bis($C_{1-9}$alkylaryl)pentaerythritol diphosphite [e.g., bis(2,4-di-t-butylphenyl) pentaerythritol diphosphite, bis(2,4-di-t-buytl-4-methylphenyl)pentaerythritol diphosphite, bis(2,6-di-t-butyl-4-methylphenyl)pentaerythritol diphosphite, bis (nonylphenyl)pentaerythritol diphosphite], a triphenyl phosphate-series stabilizer (e.g., 4-phenoxy-9-α-(4-hydroxyphenyl)-p-cumenyloxy-3,5,8,10-tetraoxa-4,9-diphosphaspiro[5.5]undecane, tris(2,4-di-t-butylphenyl)phosphate], and a diphosphonite-series stabilizer (e.g., tetrakis(2, 4-di-t-butyl)-4,4'-biphenylene diphosphonite). The phosphorus-containing stabilizer usually has a branched $C_{3-6}$alkylphenyl group (particularly, t-butylphenyl group).

The hydroquinone-series antioxidant includes, for example, 2,5-di-t-butylhydroquinone, and the quinoline-series antioxidant includes, for example, 6-ethoxy-2,2,4-trimethyl-1,2-dihydroquinone. The sulfur-series antioxidant includes, for example, dilaurylthiodipropionate, distearylthiodiproionate, and others.

The inorganic stabilizer includes an inorganic metal-series stabilizer (or a mineral stabilizer) such as a hydrotalcite and a zeolite. As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

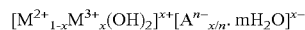

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is 0<x<0.5; and m is $0 \leqq m<1$.

Incidentally, the hydrotalcite is available from Kyowa Chemical Industry Co., Ltd. under the trade name "DHT-4A", "DHT-4A-2", or "Alcamizer".

The zeolite is not particularly limited to a specific one, and for example, zeolites recited in Japanese Patent Application Laid-Open No. 62142/1995 (JP-7-62142A) [zeolites the smallest unit cell of which is a crystalline aluminosilicate with an alkali and/or alkaline earth metal (A-, X-, Y-, L-, and ZSM-type zeolites, mordenite-type zeolite; chabazite, mordenite, faujasite, and other naturally-occurring zeolites)] may be employed.

Incidentally, A-type zeolite is available as "ZEOLAM-series (A-3, A-4, A-5)", "ZEOSTAR-series (KA100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd. These heat stabilizers may be used singly or in combination.

The reactive stabilizer includes a compound having a functional group reactive to an active hydrogen atom. As the compound having a functional group reactive to an active hydrogen atom, there may be exemplified a compound having at least one functional group selected from a cyclic ether group [e.g., an oxetane group (or ring), an epoxy group], an acid anhydride group, an isocyanate group, an oxazoline group (or ring), an oxazine group (or ring), a carbodiimide group, and others.

A compound having an epoxy group includes, for example, an alicyclic compound (e.g., vinylcyclohexene dioxide); a glycidyl ester compound (e.g., glycidyl versatate); a glycidyl ether compound (e.g., hydroquinone diglycidyl ether, biphenol glycidyl ether, and bisphenol A glycidyl ether (bisphenol A-based epoxy resin)); a glycidyl amine compound; an epoxy group-containing vinyl copolymer; an epoxidized polybutadiene; a copolymer of an epoxidized diene-series monomer and styrene; a triglycidyl isocyanurate; an epoxy-modified (or epoxy-containing) (poly)organosiloxane; and others.

The compound having an oxetane group includes, for example, an oxetanyl ester compound such as di[1-ethyl(3-oxetanyl)]methyl isophthalate and di[1-ethyl(3-oxetanyl)]methyl terephthalate, an oxetanyl ether compound {e.g., an alkyloxetanyl compound such as di[1-ethyl(3-oxetanyl)]methyl ether and 3-ethyl-3-(2-ethylhexyloxymethyl)oxetane, an aryloxetanyl compound such as 3-ethyl-3-(phenoxymethyl) oxetane, an aralkyloxetanyl ether compound such as 1,4-bis{[(3-ethyl-3-oxetanyl)methoxy]methyl}benzene, a bisphenol-based oxetane resin such as a bisphenol-A di[1-ethyl(3-oxetanyl)]methyl ether, a novolak oxetane resin such as a mono- to poly[1-ethyl(3-oxetanyl)]methyl etherified phenol novolak resin and a mono- to poly [1-ethyl(3-oxetanyl)]methyl etherified cresol novolak resin}, an oxetane-modified (or oxetane-containing) (poly)organosiloxane such as 3-ethyl-3-{[3-(triethoxysilyl)propoxy]methyl}oxetane, and a derivative having an alkyloxetanyl unit [e.g., a derivative having an alkyl(3-oxetanyl)methyl unit] corresponding to the derivative having the oxetanyl unit [e.g., the derivative having the [1-ethyl(3-oxetanyl)]methyl unit].

The compound having an acid anhydride group includes, for example, an olefinic resin having a maleic anhydride group (e.g., an ethylene-maleic anhydride copolymer, and amaleic anhydride-modified polypropylene), and others.

Examples of the compound having an isocyanate group include an aliphatic isocyanate such as hexamethylene diisocyanate, an alicyclic isocyanate such as isophorone diisocyanate, an aromatic isocyanate such as diphenylmethane isocyanate, a modified product thereof (e.g., a trimer of isophorone diisocyanate), and others.

The compound having an oxazoline group includes, for example, a bisoxazoline compound such as 2,2'-(1,3-phenylene)-bis(2-oxazoline) or 2,2'-(1,4-phenylene)-bis(2-oxazoline), a vinyl-series resin having an oxazoline group (e.g., a vinyl oxazoline-modified styrenic resin), and others.

Examples of the compound having an oxazine group include a bisoxazine compound such as 2,2'-bis(5,6-dihydro-4H-1,3-oxazine), and others.

As the compound having a carbodiimide group, there may be mentioned, for example, a polyarylcarbodiimide such as a poly(phenylcarbodiimide), and a poly(naphthylcarbodiimide); a polyalkylarylcarbodiimide such as a poly(2-methyldiphenylcarbodiimide), a poly(2,6-diethyldiphenylcarbodiimide), a poly(2,6-diisopropyldiphenylcarbodiimide), a poly (2,4,6-triisopropyldiphenylcarbodiimide), and a poly(2,4,6-tri-t-butyldiphenylcarbodiimide); a poly[alkylenebis (alkyl- or cycloalkyl-aryl)carbodiimide] such as a poly[4,4'-methylenebis(2,6-diethylphenyl)carbodiimide], a poly[4,4'-methylenebis(2-ethyl-6-methylphenyl)carbodiimide], a poly[4,4'-methylenebis(2,6-diisopropylphenyl)carbodiimide], and a poly[4,4'-methylenebis(2-ethyl-6-methylcyclohexylphenyl) carbodiimide]; and others.

These antioxidants and/or stabilizers may be used singly or in combination. The content of the antioxidant and/or the stabilizer may for example be selected within the range of about 0.01 to 5 parts by weight, preferably about 0.05 to 3 parts by weight (e.g., about 0.05 to 2.5 parts by weight), and particularly about 0.1 to 2.5 parts by weight (e.g., about 0.1 to 1 part by weight), relative to 100 parts by weight of the thermoplastic resin.

Incidentally, in the case using a polyester-series resin or a polycarbonate-series resin as a thermoplastic resin, addition of a phosphoric acid exemplified in the paragraph on the foregoing nitrogen-containing cyclic compound (B3) (for example, an inorganic phosphoric acid such as a phosphoric acid, a phosphorous acid, a phosphonic acid, a hypophosphorous acid, and a polyphosphoric acid; an organic phosphoric acid such as a phosphonocarboxylic acid, and a nitrogen-containing phosphoric acid) realizes further improvement of thermal stability.

(Dripping Inhibitor)

Further, to the flame-retardant resin composition of the present invention may be added a dripping inhibitor such as a fluorine-containing resin. Dripping of kindling material and a molten solution upon combustion is inhibited by the addition of a dripping inhibitor. As the fluorine-containing resin, there may be mentioned a homo- or copolymer of a fluorine-containing monomer such as tetrafluoroethylene, chlorotrifluoroethylene, vinylidene fluoride, hexafluoropropylene and perfluoroalkyl vinyl ether; and a copolymer of the fluorine-containing monomer and a copolymerizable monomer such as ethylene, propylene and acrylate. Examples of the fluorine-containing resin (or fluorine-series resin) are a homopolymer such as a polytetrafluoroethylene, a polychlorotrifluoroethylene and a polyvinylidene fluoride; and a copolymer such as a tetrafluoroethylene-hexafluoropropylene copolymer, a tetrafluoroethylene-perfluoroalkyl vinyl ether copolymer, an ethylene-tetrafluoroethylene copolymer and an ethylene-chlorotrifluoroethylene copolymer. These fluorine-containing resins may be used singly or in combination.

The fluorine-containing resin may be used in the form of particles, and the mean particle size may for example be about 10 to 5,000 μm, preferably about 100 to 1,000 μm, and more preferably about 100 to 700 μm.

The content of the fluorine-containing resin is, for example, about 0.01 to 10 parts by weight, preferably about 0.1 to 5 parts by weight, and more preferably about 0.1 to 3 parts by weight, relative to 100 parts by weight of the total amount of the base resin (A), the aromatic resin (B1) and the styrenic resin (C).

(Metal Salt of Inorganic Acid)

As the metal salt of the inorganic acid, an inorganic acid other than the above-mentioned metal borate and metal hydrogenphosphate (E2) may be used. As the inorganic acid constituting the salt, there may be used a variety of inorganic acids such as a hydrochloric acid, a nitric acid, a sulfuric acid, a phosphoric acid, a boric acid, a carbonic acid, and a stannic acid. As the metal forming a salt with the inorganic acid, the metal exemplified in the paragraph of the metal borate (E2) may be used.

(1) Metal Phosphate

As the phosphoric acid, there may be used the phosphoric acid exemplified in the paragraph of the above-mentioned metal hydrogenphosphate (E2). The metal preferably includes a polyvalent metal, for example, the alkaline earth metal, the transition metal, the metals of the Groups 2B and 3B of the Periodic Table of Elements, and particularly the alkaline earth metal.

As the metal phosphate (or metal salt of a phosphoric acid), there may be mentioned a salt of the phosphoric acid with the polyvalent metal. The metal salt may have a ligand (e.g., hydroxo, halogen).

As the metal phosphate, there may be used, for example, a pyrophosphate (such as $Ca_2P_2O_7$), a polymetaphosphate (such as $Ca_3(P_3O_9)$ 2), a salt of anhydrous phosphoric acid (such as $Ca_2(P_4O_{12})$ and $Ca_5(P_3O_{10})_2$), in addition a condensed phosphate (such as $Ca_5(PO_4)_3(OH)$ and $Ca_5(PO_4)_3(F, Cl)$).

(2) Metal Stannate

Exemplified as a stannic acid is stannic acid, metastannic acid, orthostannic acid, hexahydroxostannic acid, or others. As a metal, there may be exemplified an alkali metal, or a polyvalent metal such as an alkaline earth metal, a transition metal, and the metal of the Group 2B of the Periodic Table of Elements. The metal stannate is usually a salt hydrate and includes, for example, an alkali metal stannate (e.g., sodium stannate, potassium stannate), an alkaline earth metal stannate (e.g., magnesium stannate), a transition metal stannate (e.g., cobalt stannate), and a salt of stannic acid with the metal of the Group 2B of the Periodic Table of Elements (e.g., zinc stannate). Among these metal stannates, a salt of stannic acid with the metal of the Group 2B of the Periodic Table of Elements [in particular a zinc stannate] is preferred. These metal stannates may be used singly or in combination.

As a metal salt of an inorganic acid (oxygen acid) other than a phosphoric acid, a boric acid, and a stannic acid, there may be used various metal salts corresponding to the metal phosphate and metal borate.

Among these metal salts of inorganic acids, a metal phosphate, in particular an alkaline earth metal hydrogenphosphate (e.g., calcium hydrogenphosphate), is preferred.

Further, the flame-retardant resin composition of the present invention may comprise other additive(s) for any purpose. As other additive(s), there may be mentioned a stabilizer (e.g., an ultraviolet ray absorbing agent, a heat stabilizer, a weather-resistant stabilizer), a lubricant, a mold-release agent (releasing agent), a coloring agent (colorant), a plasticizer, a nucleating agent, an impact resistance improver (impact modifier), a slip-(friction/wear) improving agent, and others.

The flame retardant of the present invention imparts high flame retardancy to a resin probably because the flame retardant facilitates carbonization of the resin surface on burning. Moreover, the combination use of a specific flame retardant (B) and a styrenic resin having a low melt flow rate (C) effectively realizes high flame retardancy of a base resin in small amount of the flame retardant, and in addition does not bleed out or deteriorate heat stability.

[Production Process of Flame-Retardant Resin Composition]

The flame-retardant resin composition of the present invention may be a particulate mixture or a molten mixture, and it may be prepared by mixing the thermoplastic resin with the flame retardant, and if necessary, the dripping inhibitor or other additive(s) in a conventional manner. For example, (1) a process comprising mixing each component, kneading and extruding the resulting mixture into pellets with a uniaxial or biaxial extruder, and molding the pellets, (2) a process comprising once making pellets (master batch) different in composition, mixing (diluting) the pellets in a certain amount, and molding the resulting pellets to give a shaped article having a specific composition, or (3) a process comprising directly charging one or not less than 2 of each component with a molding machine, is utilized. Further, as a production process of pellets with an extruder, for example, the following processes are available: (1) a production process comprising precedently melt-mixing all components except a brittle or fragile filler such as a glass-series filler, and then mixing the brittle or fragile filler with the mixture; (2) a production process comprising precedently melt-mixing all components except a phosphoric ester and a brittle or fragile filler (such as a glass-series filler), and then mixing the phosphorus-/1 compound and the brittle or fragile filler with the mixture simultaneously (in the same feed position); (3) a production process comprising precedently melt-mixing all components except a phosphoric ester and a brittle or fragile filler (such as a glass-series filler), and then mixing the brittle or fragile filler and the phosphorus-containing compound with the mixture sequentially (in different feed positions); and other processes. In the pellet production with use of an extruder, a small amount of a dispersing auxiliary agent such as an aromatic compound or halogen-containing compound (e.g., benzene, toluene, xylene, chlorobenzene, trichlorobenzene, chloroform, trichloroethylene) may be blended in the extrusion step. The dispersing auxiliary agent is removed from the kneaded resin through a vent-port of the extruder. Moreover, in the preparation of the composition for a shaped article, dispersion of other component(s) (e.g., a flame retardant) may be improved advantageously by mixing a powdery or particulate base resin (e.g., a powder or particulate obtained by pulverizing a part or all of the polyester-series resin) with the other component(s) and melt-kneading the mixture.

Incidentally, for imparting handling, it is usable to prepare the master batch by melt-mixing a non-resinous component(s) (e.g., the phosphoric ester, the nitrogen-containing cyclic compound, the metal salt of an inorganic acid) and a resinous component(s) (e.g., the base resin, and the aromatic resin). In particular, when a red phosphorus is used in combination as the phosphorus-/1 compound, a master batch is often prepared. Moreover, when a master batch comprises the resinous component(s), part of the thermoplastic resin is used as a master batch in many cases.

The master batch includes, for example, (a) a master batch comprising a part of a base resin, and a non-resinous component; (b) a master batch comprising an aromatic resin and a non-resinous component; (c) a master batch comprising an aromatic resin, a resinous flame retardant, and a non-resinous component; (d) a master batch comprising a part of a base resin, an aromatic resin, and a non-resinous component; (e) a master batch comprising a part of a base resin, a resinous component, and a non-resinous component; and (f) a master batch comprising a part of a base resin, an aromatic resin, a resinous component, and a non-resinous component.

If necessary, the master batch may comprise a variety of additives such as a fluorine-containing resin, an antioxidant, a phosphorus-containing stabilizer, an inorganic stabilizer, a reactive stabilizer, and a filler.

The flame-retardant resin composition can be produced by melt-mixing thus obtained master batch, a base resin, and if necessary a residual component(s).

Moreover, a shaped article may be obtained by melt-mixing the flame-retardant resin composition of the present invention and molding the composition by a conventional manner such as extrusion molding, injection molding and compression molding. The shaped article is excellent in flame retardancy and molding processability (mold-processability), and may be utilized for various purposes. For example, the shaped article is suitable for an electric or electronic device part, an office automation (OA) device part, a household electrical appliance part, a mechanical device part, an automotive part (automotive device part), a packaging material or a case, and others.

INDUSTRIAL APPLICABILITY

According to the present invention, the combination use of a base resin, a specific flame retardant, and a styrenic resin having a melt flow rate of not more than 8 g/10 minutes shortens the combustion time or growing time, inhibits dripping, and imparts high flame retardancy to the resin even in small amount of the flame retardant without using a halogen-series flame retardant. In particular, mold deposit and bleeding out (or blooming) of the flame retardant is effectively inhibited without deteriorating resin properties. Moreover, a flame-retardant resin composition which is excellent in hydrolysis resistance of the phosphoric ester can be obtained. Further, a shaped article having improved flame retardancy can be obtained by the use of such a resin composition.

EXAMPLES

The following examples are intended to describe this invention in further detail and should by no means be interpreted as defining the scope of the invention.

Incidentally, flame retardancy of a resin composition was evaluated on the basis of the following tests.

(Flame Retardancy Test)

In accordance with UL94, the combustion test was carried out 5 times by using a test piece 0.8 mm thick, and the flame retardancy [rating the test piece according to UL94, and average combustion time (second) for 10-times flame applications] and dripping properties were evaluated.

(Evaluation of Blooming Properties)

A test piece 0.8 mm thick for combustion (or burning) was heated at 150° C. for 5 hours, and visually observed for the state of bleeding out in the surface of the test piece. The blooming properties were evaluated on the basis of the following judgmental standard.
"A": no bleeding out was observed
"B": slight bleeding out was observed
"C": remarkable bleeding out was observed

[Base Resin A (Polyester-Series Resin A)]
A-1: Polybutylene terephthalate ["DURANEX", intrinsic viscosity=1.0, manufactured by Polyplastics Co., Ltd.]
A-2: Polyethylene terephthalate ["BELLPET EFG10", manufactured by Kanebo Gohsen, Ltd.]

[Flame Retardant B]

[Polyphenylene Oxide-Series Resin/Polyphenylene Sulfide-Series Resin B1 (PPO/PPS B1)]
B1-1: Poly(2,6-dimethyl-1,4-phenylene)oxide ("PPE polymer YPX-100F", manufactured by Mitsubishi Gas Chemical Co., Inc.)
B1-2: Poly(1,4-phenylene)sulfide

[Phosphoric Ester B2]
B2-1: Resorcinolbis(di-2,6-xylenyl phosphate) ["PX200", manufactured by Daihachi Chemical Industry Co., Ltd.]
B2-2: Hydroquinone bis(di-2,6-xylenyl phosphate) ["PX201", manufactured by Daihachi Chemical Industry Co., Ltd.]
B2-3: Biphenol bis(di-2,6-xylenyl phosphate) ["PX202", manufactured by Daihachi Chemical Industry Co., Ltd.]
B2-4: Bisphenol-A bis(diphenyl phosphate) ["ADK STAB FP-700", manufactured by Asahi Denka Co., Ltd.]
B2-5: Phenoxyphosphazene [a mixture of 3- to 4-cyclic compounds]
B2-6: 1,4-piperazinediyltetraphenyl phosphate [N,N'-bis(diphenoxyphosphinyl)piperazine]

[Nitrogen-Containing Cyclic Compound B3]
B3-1: Melam polyphosphate ["PMP200", manufactured by Nissan Chemical Industries, Ltd.]
B3-2: Polyphosphoric acid amide ["SUMISAFE PM", manufactured by Sumitomo Chemical Co., Ltd.]
B3-3: Melamine polyphosphate ["Melapur 200", manufactured by DSM]
B3-4: Melamine polymetaphosphate: a compound synthesized according to Example 1 described in Japanese Patent Application Laid-Open No. 81691/1998 (JP-10-81691A)
B3-5: Melamine sulfate ["APINON 901", manufactured by Sanwa Chemical Co., Ltd.]
B3-6: Melamine cyanurate ["MC610", manufactured by Nissan Chemical Industries, Ltd.]

[Styrenic Resin C]
C-1: Polystyrene [melt flow rate=1 g/10 minutes, which was measured under the condition of JIS K7210 (condition of Table 1-8: test temperature of 200° C. and test load of 49.03N) according to JIS K6871]
C-2: Polystyrene [melt flow rate=4 g/10 minutes, which was measured under the condition of JIS K7210 (condition of Table 1-8: test temperature of 200° C. and test load of 49.03N) according to JIS K6871]
C-3: Polystyrene [melt flow rate=8.5 g/10 minutes, which was measured under the condition of JIS K7210 (condition of Table 1-8: test temperature of 200° C. and test load of 49N) according to JIS K6871]
C-4: Acrylonitrile-styrene copolymer [melt flow rate=1.5 g/10 minutes, which was measured under the condition of JIS K7210 (condition of Table 1-8: test temperature of 200° C. and test load of 49N) according to JIS K6875]

C-5: Acrylonitrile-butadiene-styrene copolymer [melt flow rate=1.1 g/10 minutes, which was measured under the condition of JIS K7210 (condition of Table 1-8: test temperature of 200° C. and test load of 49N) according to JIS K6874]

[Inorganic Filler D]
D-1: Glass fiber (chopped strand having 10 μm in diameter and 3 mm long)
D-2: Glass fiber (chopped strand having 13 μm in diameter and 3 mm long)
D-3: Calcium carbonate
D-4: Talc

[Resinous Flame-Retardant Auxiliary E1]
E1-1: Polycarbonate ["PANLITE L1225", manufactured by Teijin Chemicals Ltd.]
E1-2: Phenoxy resin ["PHENOTOHTO YP-50", manufactured by Tohto Kasei Co., Ltd.]
E1-3: Novolak phenol resin ["SUMILITE RESIN PR-53647", manufactured by Sumitomo Durez Co., Ltd.]
E1-4: Polyarylate ["POLYARYLATE U100", manufactured by Unitika Ltd.]
E1-5: Bisphenol A-based epoxy resin ["EPIKOTE 1004K", manufactured by Yuka Shell Epoxy K.K.]
E1-6: Novolak epoxy resin [number average molecular weight (Mn)=about 570, manufactured by Aldrich Chemical Company, Inc.]

[Inorganic Flame-Retardant Auxiliary E2]
E2-1: Anhydrous calcium secondary phosphate [mean particle size=about 30 μm, manufactured by Taihei Chemical Industrial Co., Ltd.
E2-2: Zinc borate ["FIREBRAKE ZB", manufactured by Borax Japan Ltd.]

[Flame-Retardant Auxiliary E3] E3-1: Magnesium hydroxide ["KISUMA 5E", manufactured by Kyowa Chemical Industry Co., Ltd.]

[Antioxidant F]
F-1: Pentaerythritol-tetrakis[3-(3,5-di-t-butyl-4-hydroxyphenyl)propionate] ["IRGANOX 1010", manufactured by Ciba-Geigy Ltd.]

[Stabilizer G]
G-1: Bis-(2,6-di-t-butyl-4-methylphenyl)pentaerythritol diphosphite ["ADK STAB PEP36", manufactured by Adeka Argus Chemical Co., Ltd.]
G-2: Tetrakis(2,4-di-t-butylphenyl)-4,4'-biphenylene diphosphonite ["SANDOSTAB P-EPQ", manufactured by Sandoz.]
G-3: Glycidyl versatate
G-4: 1,4-bis{[(3-ethyl-3-oxetanyl)methoxy]methyl} benzene ["OXT-121", manufactured by Toagosei Co., Ltd.]
G-5: Hydrotalcite ["DHT-4A", manufactured by Kyowa Chemical Industry Co., Ltd.]
G-6: Zeolite ["ZEOLAM A-3", manufactured by Tosoh Corp.]

[Dripping Inhibitor H]
H-1: Polytetrafluoroethylene

Examples 1 to 41 and Comparative Examples 1 to 12

The above components were mixed in the ratio (parts by weight) described in Tables 1 to 5, and the mixture was kneaded and extruded with the use of an extruder to prepare a resin composition. The obtained resin composition was subjected to injection molding to make shaped articles for testing. The flame retardancy, dripping properties, and blooming properties were evaluated with the use of the test shaped articles. The results are shown in Tables 1 to 5.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Polyester-series resin A (parts by weight) | A-1 100 | A-1 100 | A-1 100 | A-1 100 | A-1 100 | A-1 100 | A-1 100 | A-1 100 | A-1 100 | A-1 100 |
| PPO/PPS B1 (parts by weight) | B1-1 30 | B1-1 30 | B1-1 50 | B1-1 50 | B1-1 30 | B1-1 30 | B1-1 30 | B1-1 30 | B1-1 40 | B1-1 40 |
| Phosphoric ester B2 (parts by weight) | B2-1 40 | B2-1 40 | B2-1 60 | B2-1 60 | B2-2 40 | B2-3 40 | B2-1 40 | B2-1 40 | B2-1 40 | B2-1 40 |
| Nitrogen-containing cyclic compound B3 (parts by weight) | — | — | — | — | — | — | — | — | B3-1 15 | B3-1 15 |
| Styrenic resin C (parts by weight) | C-1 10 | C-2 10 | C-1 15 | C-2 15 | C-1 10 | C-1 10 | C-1 10 | C-2 10 | C-1 10 | C-2 10 |
| Inorganic filler D (parts by weight) | D-1 80 | D-2 80 | D-1 100 | D-2 100 | D-1 80 | D-1 80 | D-1 80 | D-2 80 | D-1 90 | D-2 90 |
| Resinous flame-retardant auxiliary E1 (parts by weight) | — | — | — | — | — | — | — | — | — | — |
| Inorganic flame-retardant auxiliary E2 (parts by weight) | — | — | — | — | — | — | — | — | — | — |
| Antioxidant F (parts by weight) | F-1 0.8 | F-1 0.8 | F-1 1.0 | F-1 1.0 | F-1 0.8 | F-1 0.8 | F-1 0.8 | F-1 0.8 | F-1 1.0 | F-1 1.0 |
| Stabilizer G (parts by weight) | — | — | — | — | — | — | G-1 0.8 | G-2 0.8 | — | — |
| Dripping inhibitor H (parts by weight) | H-1 1.3 | H-1 1.3 | H-1 1.5 | H-1 1.5 | H-1 1.3 | H-1 1.3 | H-1 1.3 | H-1 1.3 | H-1 1.5 | H-1 1.5 |
| UL94 flame retardancy | V-1 | V-1 | V-0 | V-0 | V-1 | V-1 | V-1 | V-1 | V-0 | V-0 |

TABLE 1-continued

| | | | | | | | | | | |
|---|---|---|---|---|---|---|---|---|---|---|
| Average combustion time (sec.) | 6.1 | 4.3 | 3.7 | 3.1 | 7.1 | 8.1 | 6.1 | 5.3 | 1.9 | 1.8 |
| Dripping properties | no | no | no | no | no | no | no | no | no | no |
| Blooming properties | A | A | A | A | A | A | A | A | A | A |

| | Examples | | | | | | | | | |
|---|---|---|---|---|---|---|---|---|---|---|
| | 11 | 12 | 13 | 14 | 15 | 16 | 17 | 18 | 19 | 20 |
| Polyester-series resin A (parts by weight) | A-1 100 | A-1 100 | A-1 100 | A-1 100 | A-1 100 | A-1 100 | A-1 100 | A-2 100 | A-1 100 | A-1 100 |
| PPO/PPS B1 (parts by weight) | B1-1 40 | B1-1 40 | B1-1 40 | B1-1 40 | B1-1 40 | B1-1 50 | B1-1 50 | B1-1 40 | B1-1 50 | B1-1 50 |
| Phosphoric ester B2 (parts by weight) | B2-2 40 | B2-3 40 | B2-1 40 | B2-1 40 | B2-1 40 | B2-1 40 | B2-1 40 | B2-1 15 | B2-1 60 | B2-1 60 |
| Nitrogen-containing cyclic compound B3 (parts by weight) | B3-1 15 | B3-1 15 | B3-2 15 | B3-3 15 | B3-4 15 | B3-5 15 | B3-1 15 | B3-1 40 | — | — |
| Styrenic resin C (parts by weight) | C-1 10 | C-1 10 | C-1 10 | C-2 10 | C-1 10 | C-1 10 | C-1 10 | C-2 10 | C-1 15 | C-1 15 |
| Inorganic filler D (parts by weight) | D-1 90 | D-1 90 | D-1 90 | D-2 90 | D-1 90 | D-1 90 | D-1 90 | D-1 90 | D-1 100 | D-1 100 |
| Resinous flame-retardant auxiliary E1 (parts by weight) | — | — | — | — | — | — | — | — | E1-1 3 | E1-2 3 |
| Inorganic flame-retardant auxiliary E2 (parts by weight) | — | — | — | — | — | — | — | — | — | — |
| Antioxidant F (parts by weight) | F-1 1.0 | F-1 1.0 | F-1 1.0 | F-1 1.0 | F-1 1.0 | F-1 1.0 | F-1 1.0 | F-1 1.0 | F-1 1.0 | F-1 1.0 |
| Stabilizer G (parts by weight) | — | — | — | G-2 1.0 | — | — | G-1 1.0 | G-1 1.0 | G-1 1.0 | — |
| Dripping inhibitor H (parts by weight) | H-1 1.5 | H-1 1.5 | H-1 1.5 | H-1 1.5 | H-1 1.5 | H-1 1.5 | H-1 1.5 | H-1 1.5 | H-1 1.5 | H-1 1.5 |
| UL94 flame retardancy | V-0 | V-0 | V-0 | V-0 | V-0 | V-0 | V-0 | V-0 | V-0 | V-0 |
| Average combustion time (sec.) | 2.2 | 2.4 | 2.0 | 1.8 | 2.3 | 3.3 | 1.6 | 3.6 | 3.3 | 3.1 |
| Dripping properties | no | no | no | no | no | no | no | no | no | no |
| Blooming properties | A | A | A | A | A | A | A | A | A | A |

TABLE 2

| | Examples | | | | | | | |
|---|---|---|---|---|---|---|---|---|
| | 21 | 22 | 23 | 24 | 25 | 26 | 27 | 28 |
| Polyester-series resin A (parts by weight) | A-1 100 | A-1 100 | A-1 100 | A-1 100 | A-1 100 | A-1 100 | A-1 100 | A-1 100 |
| PPO/PPS B1 (parts by weight) | B1-1 50 | B1-1 40 | B1-1 40 | B1-1 40 | B1-1 40 | B1-1 40 | B1-1 40 | B1-1 40 |
| Phosphoric ester B2 (parts by weight) | B2-1 60 | B2-1 60 | B2-1 60 | B2-1 40 | B2-1 40 | B2-1 40 | B2-1 40 | B2-1 40 |
| Nitrogen-containing cyclic compound B3 (parts by weight) | — | — | — | B3-1 15 | B3-1 15 | B3-1 15 | B3-1 10 | B3-1 15 |
| Styrenic resin C (parts by weight) | C-1 15 | C-1 10 | C-1 10 | C-1 10 | C-1 10 | C-1 10 | C-1 10 | C-1 10 |
| Inorganic filler D (parts by weight) | D-2 100 | D-1 80 | D-1 90 | D-1 90 | D-1 90 | D-1 90 | D-1 90 | D-1 90 |
| Resinous flame-retardant auxiliary E1 (parts by weight) | E1-1 3 | E1-2 3 | E1-3 3 | — | E1-1 3 | E1-2 3 | E1-1 3 | E1-2 3 | E1-3 3 | E1-4 3 |
| Inorganic flame-retardant auxiliary E2 (parts by weight) | — | — | E2-1 15 | — | — | — | — | — |
| Antioxidant F (parts by weight) | F-1 0.8 | F-1 0.8 | F-1 1.0 | F-1 1.0 | F-1 1.0 | F-1 1.0 | F-1 1.0 | F-1 1.0 |
| Stabilizer G (parts by weight) | G-1 1.0 | — | — | G-1 1.0 | — | G-1 1.0 | — | G-2 1.0 |
| Dripping inhibitor H (parts by weight) | H-1 1.5 | H-1 1.3 | H-1 1.5 | H-1 1.5 | H-1 1.5 | H-1 1.5 | — | H-1 1.5 |

TABLE 2-continued

|  | | | | | | | | |
|---|---|---|---|---|---|---|---|---|
| UL94 flame retardancy | V-0 | V-0 | V-0 | V-0 | V-0 | V-0 | V-0 | V-0 |
| Average combustion time (sec.) | 2.5 | 2.1 | 3.9 | 1.6 | 1.6 | 1.5 | 1.4 | 1.7 |
| Dripping properties | no | no | no | no | no | no | no | no |
| Blooming properties | A | A | A | A | A | A | A | A |

| | Examples | | | | | | | |
|---|---|---|---|---|---|---|---|---|
| | 29 | 30 | 31 | 32 | 33 | 34 | 35 | 36 |
| Polyester-series resin A (parts by weight) | A-1 100 | A-1 100 | A-1 100 | A-1 100 | A-2 100 | A-2 100 | A-2 100 | A-1 100 |
| PPO/PPS B1 (parts by weight) | B1-1 40 | B1-1 40 | B1-1 40 | B1-1 40 | B1-1 30 | B1-1 20 | B1-1 20 | B1-1 30 / B1-2 10 |
| Phosphoric ester B2 (parts by weight) | B2-1 40 | B2-1 40 | B2-1 40 | B2-1 40 | B2-1 40 | B2-1 25 | B2-1 25 | B2-1 40 |
| Nitrogen-containing cyclic compound B3 (parts by weight) | B3-1 10 / B3-6 5 | B3-1 5 | B3-1 5 | B3-6 5 | B3-1 5 | — | B3-1 12 | B3-1 12 | B3-1 15 |
| Styrenic resin C (parts by weight) | C-1 10 | C-1 10 | C-1 10 | C-1 10 | C-1 10 | C-1 10 | C-1 10 | C-1 10 |
| Inorganic filler D (parts by weight) | D-1 90 | D-1 90 | D-1 90 | D-1 90 | D-1 80 | D-1 70 | D-2 70 | D-1 90 |
| Resinous flame-retardant auxiliary E1 (parts by weight) | — | — | — | — | — | — | — | — |
| Inorganic flame-retardant auxiliary E2 (parts by weight) | — | E2-1 5 | E2-1 5 | E2-2 5 | — | — | — | — |
| Antioxidant F (parts by weight) | F-1 1.0 | F-1 1.0 | F-1 1.0 | F-1 1.0 | F-1 0.8 | F-1 0.8 | F-1 0.8 | F-1 1.0 |
| Stabilizer G (parts by weight) | — | — | — | — | — | — | — | — |
| Dripping inhibitor H (parts by weight) | H-1 1.5 | H-1 1.5 | H-1 1.5 | H-1 1.5 | H-1 1.3 | H-1 1.3 | H-1 1.3 | H-1 1.5 |
| UL94 flame retardancy | V-0 | V-0 | V-0 | V-0 | V-0 | V-0 | V-0 | V-0 |
| Average combustion time (sec.) | 2.0 | 1.7 | 1.9 | 1.7 | 2.2 | 2.8 | 2.1 | 2.5 |
| Dripping properties | no | no | no | no | no | no | no | no |
| Blooming properties | A | A | A | A | A | A | A | A |

TABLE 3

| | Comparative Examples | | | | | | |
|---|---|---|---|---|---|---|---|
| | 1 | 2 | 3 | 4 | 5 | 6 | 7 |
| Polyester-series resin A (parts by weight) | A-1 100 | A-1 100 | A-1 100 | A-1 100 | A-1 100 | A-1 100 | A-2 100 |
| PPO/PPS B1 (parts by weight) | B1-1 30 | — | B1-1 30 | — | B1-1 30 | B1-1 40 | B1-1 20 |
| Phosphoric ester B2 (parts by weight) | — | B2-1 40 | — | B2-1 40 | B2-1 40 | B2-1 40 | B2-1 25 |
| Nitrogen-containing cyclic compound B3 (parts by weight) | — | — | — | — | — | B3-1 15 | B3-1 12 |
| Styrenic resin C (parts by weight) | C-1 10 | C-1 10 | C-3 10 | C-3 10 | C-3 10 | C-3 10 | C-3 10 |
| Inorganic filler D (parts by weight) | D-1 80 | D-1 80 | D-1 80 | D-1 80 | D-1 80 | D-1 90 | D-1 70 |
| Resinous flame-retardant auxiliary E1 (parts by weight) | — | — | — | — | — | — | — |
| Inorganic flame-retardant auxiliary E2 (parts by weight) | — | — | — | — | — | — | — |
| Antioxidant F (parts by weight) | F-1 0.8 | F-1 0.8 | F-1 0.8 | F-1 0.8 | F-1 0.8 | F-1 1.0 | F-1 0.8 |
| Stabilizer G (parts by weight) | — | — | — | — | — | — | — |
| Dripping inhibitor H (parts by weight) | H-1 1.3 | H-1 1.3 | H-1 1.3 | H-1 1.3 | H-1 1.3 | H-1 1.5 | H-1 1.3 |
| UL94 flame retardancy | HB | HB | HB | HB | V-2 | V-0 | V-0 |
| Average combustion time (sec.) | >30 | >30 | >30 | >30 | 8.3 | 4.3 | 3.8 |
| Dripping properties | yes | yes | yes | yes | yes | yes | yes |
| Blooming properties | A | C | A | C | A | A | A |

TABLE 4

| | Examples | | | | |
|---|---|---|---|---|---|
| | 37 | 38 | 39 | 40 | 41 |
| Polyester-series resin A (parts by weight) | A-1 100 | A-1 70 / A-2 30 | A-1 50 / A-2 50 | A-1 100 | A-1 100 |
| PPO/PPS B1 (parts by weight) | B1-1 40 | B1-1 40 | B1-1 5 | B1-1 40 | B1-1 40 |
| Phosphoric ester B2 (parts by weight) | B2-1 50 | B2-4 50 | B2-1 40 | B2-5 50 | B2-6 50 |
| Nitrogen-containing cyclic compound B3 | B3-1 15 | B3-1 15 | B3-1 15 | B3-1 15 | B3-3 15 |

TABLE 4-continued

|  | Examples | | | | |
| --- | --- | --- | --- | --- | --- |
|  | 37 | 38 | 39 | 40 | 41 |
| (parts by weight) |  |  | B3-6 50 |  |  |
| Styrenic resin C (parts by weight) | C-1 13 | C-4 10 C-5 3 | C-4 15 | C-1 13 | C-4 13 |
| Inorganic filler D (parts by weight) | D-1 100 D-3 3 | D-1 100 D-4 3 | D-1 100 D-3 3 | D-1 100 | D-1 100 |
| Resinous flame-retardant auxiliary E1 (parts by weight) | E1-5 3 | E1-6 3 | E1-5 3 | E1-5 3 | E1-5 3 |
| Inorganic flame-retardant auxiliary E2 (parts by weight) | — | — | — | — | — |
| Flame-retardant auxiliary E3 (parts by weight) |  |  |  | E3-1 3 |  |
| Antioxidant F (parts by weight) | F-1 1.0 | F-1 1.0 | F-1 1.0 | F-1 1.0 | F-1 1.0 |
| Stabilizer G (parts by weight) | G-3 3 | G-4 3 | G-2 1.0 G-4 3 | G-5 3 | G-6 3 |
| Dripping inhibitor H (parts by weight) | H-1 1.5 | H-1 1.5 | H-1 1.5 | H-1 1.5 | H-1 1.5 |
| UL94 flame retardancy | V-0 | V-0 | V-0 | V-0 | V-0 |
| Average combustion time (sec.) | 2.5 | 2.9 | 3.0 | 3.7 | 2.7 |
| Dripping properties | no | no | no | no | no |
| Blooming properties | A | A | A | A | A |

TABLE 5

|  | Comparative Examples | | | | |
| --- | --- | --- | --- | --- | --- |
|  | 8 | 9 | 10 | 11 | 12 |
| Polyester-series resin A (parts by weight) | A-1 100 | A-1 70 A-2 30 | A-1 50 A-2 50 | A-1 100 | A-1 100 |
| PPO/PPS B1 (parts by weight) | B1-1 40 | B1-1 40 | B1-1 5 | B1-1 40 | B1-1 40 |
| Phosphoric ester B2 (parts by weight) | B2-1 50 | B2-4 50 | B2-1 40 | B2-5 50 | B2-6 40 |
| Nitrogen-containing cyclic compound B3 (parts by weight) | B3-1 15 | B3-1 15 | B3-1 15 B3-6 50 | B3-1 15 | B3-3 15 |
| Styrenic resin C (parts by weight) | C-3 13 | C-3 13 | C-3 15 | C-3 13 | C-3 13 |
| Inorganic filler D (parts by weight) | D-1 100 D-3 3 | D-1 100 D-4 3 | D-1 100 D-4 3 | D-1 100 | D-1 100 |
| Resinous flame-retardant auxiliary E1 (parts by weight) | — | — | — | — | — |
| Inorganic flame-retardant auxiliary E2 (parts by weight) | — | — | — | — | — |
| Flame retardant synergist E3 (parts by weight) | — | — | — | — | — |
| Antioxidant F (parts by weight) | F-1 1.0 | F-1 1.0 | F-1 1.0 | F-1 1.0 | F-1 1.0 |
| Stabilizer G (parts by weight) | G-3 3 | G-4 3 | G-2 1.0 G-4 3 | G-5 3 | G-6 3 |
| Dripping inhibitor H (parts by weight) | H-1 1.5 | H-1 1.5 | H-1 1.5 | H-1 1.5 | H-1 1.5 |
| UL94 flame retardancy | V-0 | V-0 | V-0 | V-1 | V-0 |
| Average combustion time (sec.) | 3.8 | 4.4 | 3.9 | 8.6 | 4.1 |
| Dripping properties | yes | yes | yes | yes | yes |
| Blooming properties | A | A | A | A | A |

As apparent from Tables, every resin composition of Examples, which comprises a flame retardant composed of a specific aromatic resin (B1), a phosphoric ester (B2), a nitrogen-containing cyclic compound (B3) and a styrenic resin (C) having a low melt flow rate, was excellent in flame retardancy compared with every resin composition of Comparative Examples, which are free from any of the above-mentioned components.

The invention claimed is:

1. A flame-retardant resin composition, which comprises (A) a base resin, (B) a flame retardant, and (C) a styrenic resin, wherein
  the flame retardant (B) comprises (B1) at least one aromatic resin selected from the group consisting of a polyphenylene oxide-series resin and a polyphenylene sulfide-series resin, and (B2) a phosphoric ester and (B3) a nitrogen-containing cyclic compound, wherein
  the nitrogen-containing cyclic compound (B3) is (a) a nitrogen-containing cyclic compound having an amino group, (b) a salt of a nitrogen-containing cyclic compound having an amino group with an oxygen acid, (c) a salt of a nitrogen-containing cyclic compound having an amino group with an organic phosphoric acid, or (e) a polyphosphoric acid amide, and wherein
  the nitrogen-containing cyclic compound having an amino group (a) is guanylmelamine, a melamine condensate selected from the group consisting of melem, melam and melon, a copolycondensed resin of a melamine, guanamine, methylguanamine, acetoguanamine, benzoguanamine, succinoguanamine or CTU-guanamine; and wherein
  the styrenic resin (C) has a melt flow rate of 0.1 g/10 minutes to 5 g/10 minutes in accordance with Japanese Industrial Standards (JIS) K7210.

2. A flame-retardant resin composition according to claim 1, wherein the styrenic resin (C) comprises at least one styrenic resin selected from the group consisting of (1) a homo- or copolymer of an aromatic vinyl monomer, (2) a copolymer of an aromatic vinyl monomer and a vinyl cyanide monomer, and (3) a graft copolymer in which an aromatic vinyl monomer and a vinyl cyanide monomer are grafted to a rubber component.

3. A flame-retardant resin composition according to claim 1, wherein the base resin (A) comprises at least one thermoplastic resin selected from the group consisting of a polyester-series resin, a polyamide-series resin, a polycarbonate-series resin, a vinyl-series resin, an olefinic resin and an acrylic resin.

4. A flame-retardant resin composition according to claim 1, wherein the base resin (A) comprises a homo or co-polyester which has at least one unit selected from the group consisting of 1,4-cyclohexanedimethylene terephthalate, a $C_{2-4}$alkylene terephthalate, and a $C_{2-4}$alkylene naphthalate.

5. A flame-retardant resin composition according to claim 1 wherein the proportions of the flame retardant (B) and the styrenic resin (C) are 1 to 300 parts by weight and 1 to 60 parts by weight, respectively, relative to 100 parts by weight of the base resin (A).

6. A flame-retardant resin composition, which comprises:
- (A) at least one base resin selected from the group consisting of a polybutylene terephthalate, a copolyester containing a butylene terephthalate as a main unit thereof, a polyethylene terephthalate, and a copolyester containing an ethylene terephthalate as a main unit thereof
- (B) a flame retardant, and
- (C) a styrenic resin; wherein
   the flame retardant (B) comprises the following components (B1), (B2) and (B3):
- (B1) at least one aromatic resin selected from the group consisting of a polyphenylene oxide-series resin and a polyphenylene sulfide-series resin,
- (B2) a condensed phosphoric ester,
- (B3) at least one member selected from the group consisting of (i) melamine polyphosphate, (ii) melam polyphosphate, (iii) melem polyphosphate, (iv) melon polyphosphate, (v) a double salt of polyphosphoric acid with melamine, melam and melem, and (vi) melamine polymetaphosphate, and
   wherein the styrenic resin (C) comprises a polystyrene having a melt flow rate of 0.1 g/10 minutes to 5 g/10 minutes.

7. A flame-retardant resin composition according to claim 1, which further comprises (D) an inorganic filler.

8. A flame-retardant resin composition according to claim 1, which further comprises (E) at least one flame-retardant auxiliary selected from the group consisting of (E1) a resinous flame-retardant auxiliary, and (E2) an inorganic flame-retardant auxiliary.

9. A flame-retardant resin composition according to claim 8, wherein the resinous flame-retardant auxiliary (E1) comprises at least one aromatic resin selected from the group consisting of a polycarbonate-series resin, an aromatic nylon, a polyarylate-series resin, an aromatic epoxy resin, and a resin of which the main chain or side chain contains an aromatic ring having at least one group selected from a hydroxyl group and an amino group; and the inorganic flame-retardant auxiliary (E2) comprises at least one member selected from the group consisting of a metal borate, a metal hydrogenphosphate, a red phosphorus, a metal oxide, a metal hydroxide, a metal sulfide, and an expansive graphite.

10. A flame-retardant resin composition according to claim 1, which further comprises at least one member selected from the group consisting of a hindered phenol-series antioxidant, a phosphorus-containing stabilizer, an inorganic stabilizer, a compound having a functional group reactive to an active hydrogen atom, and a fluorine-contained resin.

11. A process for producing a flame-retardant resin composition, which comprises mixing (A) a base resin, (B) a flame retardant recited in claim 1, and (C) a styrenic resin having a melt flow rate of not more than 8 g/10 minutes.

12. A shaped article formed with a flame-retardant resin composition recited in claim 1.

13. A shaped article according to claim 12, which is an electric or electronic device part, an office automation device part, a household electrical appliance part, an automotive part, or a mechanical part or machine element.

14. A flame-retardant resin composition according to claim 1, wherein the phosphoric ester (B2) comprises a condensed phosphoric ester, and the nitrogen-containing cyclic compound (B3) comprises at least one nitrogen-containing cyclic compound selected from the group consisting of (i) melamine polyphosphate, (ii) melam polyphosphate, (iii) melem polyphosphate, (iv) melon polyphosphate, (v) a double salt of polyphosphoric acid with melamine, melam and melem, and (vi) melamine polymetaphosphate and a polyphosphoric acid amide.

15. A flame-retardant resin composition according to claim 1, wherein the flame retardant (B) comprises 1 to 500 parts by weight of the aromatic resin (B1) and 0.1 to 300 parts by weight of the nitrogen-containing cyclic compound (B3), relative to 100 parts by weight of the phosphoric ester (B2).

16. A flame-retardant resin composition according to claim 1, wherein the nitrogen-containing cyclic compound (B3) is (b) a salt of a nitrogen-containing cyclic compound having an amino group with an oxygen acid, (c) a salt of a nitrogen-containing cyclic compound having an amino group with an organic phosphoric acid, or (e) a polyphosphoric acid amide.

* * * * *